United States Patent
Moriya et al.

(10) Patent No.: US 10,414,982 B2
(45) Date of Patent: Sep. 17, 2019

(54) RETARDATION FILM, METHOD OF MANUFACTURING RETARDATION FILM, LAMINATE, COMPOSITION, POLARIZING PLATE AND LIQUID CRYSTAL DISPLAY DEVICE

(71) Applicant: FUJIFILM Corporation, Tokyo (JP)

(72) Inventors: Chie Moriya, Kanagawa (JP); Ayako Muramatsu, Kanagawa (JP); Ryoji Goto, Kanagawa (JP); Shinnosuke Sakai, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 703 days.

(21) Appl. No.: 14/839,003

(22) Filed: Aug. 28, 2015

(65) Prior Publication Data
US 2016/0068756 A1    Mar. 10, 2016

(30) Foreign Application Priority Data

Aug. 29, 2014  (JP) ................................. 2014-176587
Aug. 27, 2015  (JP) ................................. 2015-167489

(51) Int. Cl.
*C09K 19/54*    (2006.01)
*C09K 19/34*    (2006.01)
(Continued)

(52) U.S. Cl.
CPC ............... *C09K 19/54* (2013.01); *C09K 19/02* (2013.01); *C09K 19/32* (2013.01);
(Continued)

(58) Field of Classification Search
CPC ........ C09K 19/02; C09K 19/32; C09K 19/54; C09K 19/3486; C09K 19/3491;
(Continued)

(56) References Cited

U.S. PATENT DOCUMENTS

2010/0045901 A1*  2/2010  Uehira ................. C07D 277/64
                                                               349/75
2010/0048757 A1*  2/2010  Okada ..................... C07C 67/08
                                                              522/182
(Continued)

FOREIGN PATENT DOCUMENTS

JP        2006-293315 A     10/2006
JP        2006293315 A   *  10/2006     ............... G02B 5/30
(Continued)

OTHER PUBLICATIONS

SciFinder, 1,3,5-adamantane trimethanol triacrylate, Boiling Point, May 9, 2018.*
(Continued)

*Primary Examiner* — Eli D. Strah
(74) *Attorney, Agent, or Firm* — Edwards Neils LLC; Jean C. Edwards, Esq.

(57) ABSTRACT

It is an object of this invention to provide a retardation film which uses a liquid crystal compound, has a suppressed streak defect and shows a good front contrast, and an application thereof. The present invention provides a retardation film in which a liquid crystal compound capable of showing a smectic phase is fixed in the smectic phase, the retardation film including a non-liquid crystal compound which satisfies the conditions A and B: condition A: molecular weight is 10000 or less; and condition B: T0−T1≤30° C. T0 represents the phase transition temperature between the nematic phase and the isotropic phase of a composition which does not contain the non-liquid crystal compound, and T1 represents the phase transition temperature between the nematic phase and the isotropic phase of a composition which contains the non-liquid crystal compound.

19 Claims, 2 Drawing Sheets

(51) Int. Cl.
*C09K 19/02* (2006.01)
*C09K 19/32* (2006.01)
*G02B 5/30* (2006.01)
*G02F 1/13363* (2006.01)
*B05D 5/06* (2006.01)
*C09K 19/56* (2006.01)
*C09K 19/52* (2006.01)
*G02F 1/137* (2006.01)
*C09K 19/04* (2006.01)

(52) U.S. Cl.
CPC ...... *C09K 19/3486* (2013.01); *C09K 19/3491* (2013.01); *C09K 19/3494* (2013.01); *C09K 19/3497* (2013.01); *G02B 5/3016* (2013.01); *B05D 5/06* (2013.01); *B32B 2457/202* (2013.01); *C09K 19/52* (2013.01); *C09K 19/56* (2013.01); *C09K 2019/0448* (2013.01); *C09K 2019/546* (2013.01); *C09K 2019/548* (2013.01); *G02F 1/13363* (2013.01); *G02F 1/13781* (2013.01); *Y10T 428/1036* (2015.01); *Y10T 428/1041* (2015.01)

(58) Field of Classification Search
CPC ............ C09K 19/3494; C09K 19/3497; C09K 2019/0448; C09K 19/52; C09K 19/56; C09K 2019/546; C09K 2019/548; G02B 5/3016; B05D 5/06; Y10T 428/1036; Y10T 428/1041; B32B 2457/202; G02F 1/13363; G02F 1/13781
See application file for complete search history.

(56) References Cited

U.S. PATENT DOCUMENTS

2011/0015426 A1\* 1/2011 Yokoyanna ............ C09K 19/32
560/76
2012/0262650 A1\* 10/2012 Buchanan ................ C08B 3/16
349/96

FOREIGN PATENT DOCUMENTS

| JP | 2007-191442 A | 8/2007 |
| JP | 2008-273925 A | 11/2008 |
| JP | 2010-090221 A | 4/2010 |
| WO | 2008/072794 A1 | 6/2008 |

OTHER PUBLICATIONS

Notification of Reasons for Refusal issued by the Japanese Patent Office (JPO) dated Aug. 23, 2016 in connection with Japanese Patent Application No. 2015-167489.

\* cited by examiner

RETARDATION FILM, METHOD OF MANUFACTURING RETARDATION FILM, LAMINATE, COMPOSITION, POLARIZING PLATE AND LIQUID CRYSTAL DISPLAY DEVICE

CROSS-REFERENCE TO RELATED APPLICATIONS

The present application claims priority under 35 U.S.C. § 119 to Japanese Patent Applications No. 2014-176587 filed Aug. 29, 2014 and No. 2015-167489 filed Aug. 27, 2015. The above applications are hereby expressly incorporated by reference, in their entirety, into the present application.

TECHNICAL FIELD

This invention relates to a retardation film which has a suppressed streak defect and shows a good contrast, a method of manufacturing a retardation film, a laminate, a composition, a polarizing plate and a liquid crystal display device.

BACKGROUND ART

Liquid crystal display device has been widely disseminated in recent years, as a device for displaying image. Since the liquid crystal display device controls light based on retardation, so that retardation film has been used for high-quality image display. Optically-anisotropic layer composed of a polymer film showing birefringence is generally used as the retardation film. Liquid crystal material used for the optically-anisotropic layer is often a thermotropic liquid crystal, which destabilizes depending on ambient temperature, so that the thermal stability is improved by introducing a polymerizable group into a liquid crystal compound which configures the liquid crystal material and fixing the alignment of the liquid crystal compound by polymerization. For example, JP-A-2007-191442 describes a polymerizable liquid crystal composition which contains a polymerizable liquid crystal compound containing a biphenyl skeleton in the molecule thereof, and shows a smectic-A phase at room temperature.

SUMMARY OF THE INVENTION

The retardation film manufactured by using such liquid crystal compound showing the smectic phase successfully gives a high front contrast when incorporated into the liquid crystal display device, as compared with the case where a liquid crystal compound showing the nematic phase is used. The contrast is, however, yet insufficient due to streak defect specific to the smectic liquid crystal. It is therefore an object of this invention to provide a retardation film which uses a liquid crystal compound capable of showing the smectic phase, has a suppressed streak defect and shows a good front contrast when incorporated into the liquid crystal display device. It is another object of this invention to provide a method of manufacturing the retardation film, a laminate using the retardation film, a polarizing plate and a liquid crystal display device, as well as a composition used for manufacturing the retardation film.

After intensive studies conducted under such circumstances, the present inventors found that a retardation film relieved from the problems can be successfully provided by using a composition obtained by mixing a liquid crystal compound capable of showing a smectic phase, with a compound as an alignment modifier, the compound showing a small effect of decreasing the phase transition temperature between the nematic phase and the isotropic phase of liquid crystal, and by fixing the liquid crystal compound in the smectic phase. Thus, the present invention has been completed. More specifically, the present invention will provide the following:

[1] A retardation film in which a liquid crystal compound capable of showing a smectic phase is fixed in the smectic phase, the retardation film comprising a non-liquid crystal compound which satisfies the conditions A and B below:

molecular weight is 10000 or less; and     condition A:

$T0-T1 \leq 30°$ C.,     condition B:

where, T0 represents a phase transition temperature, in ° C., between a nematic phase and an isotropic phase, of a composition which contains the liquid crystal compound showing the smectic phase, and does not contains the non-liquid crystal compound, and T1 represents a phase transition temperature, in ° C., between a nematic phase and an isotropic phase, of a composition which contains the liquid crystal compound showing the smectic phase, and 6% by mass, relative to the mass of the liquid crystal compound, of the non-liquid crystal compound.

[2] The retardation film of [1], in which the non-liquid crystal compound satisfies the condition B-1 below:

$T0-T1 \leq 10°$ C.     condition B-1:

where T0 and T1 are as defined in [1].

[3] The retardation film of [1] or [2], wherein the non-liquid crystal compound satisfies the conditions C and D below:

boiling point$>T0$; and     condition C:

$T0'-T1' \leq 15°$ C.,     condition D:

where T0 is as defined in [1],

T0' represents a phase transition temperature, in ° C., between a smectic phase and a nematic phase, of a composition which contains the liquid crystal compound showing the smectic phase, and does not contains the non-liquid crystal compound, and T1' represents a phase transition temperature, in ° C., between a smectic phase and a nematic phase, of a composition which contains the liquid crystal compound showing the smectic phase, and 6% by mass, relative to the mass of the liquid crystal compound, of the non-liquid crystal compound.

[4] A retardation film in which a liquid crystal compound capable of showing a smectic phase is fixed in the smectic phase, the retardation film comprising a non-liquid crystal compound which satisfies the conditions A and B below, and having a bridged cyclic structure:

molecular weight is 10000 or less; and     condition A:

$T0-T1 \leq 30°$ C.,     condition B:

where, T0 represents the phase transition temperature, in ° C., between the nematic phase and the isotropic phase, of a composition which contains the liquid crystal compound showing the smectic phase, and does not contains the non-liquid crystal compound, and T1 represents the phase transition temperature, in ° C., between the nematic phase and the isotropic phase, of a composition which contains the liquid crystal compound showing the smectic phase, and 6% by mass, relative to the mass of the liquid crystal compound, of the non-liquid crystal compound.

[5] The retardation film of any one of [1] to [4] wherein the retardation film comprises a composition which contains the liquid crystal compound and the non-liquid crystal compound, and the non-liquid crystal compound has a melting point lower than the phase transition temperature between the nematic phase and the smectic phase of the composition.

[6] The retardation film of [5], wherein the phase transition temperature between the nematic phase and the smectic phase of the composition is 100° C. or below.

[7] The retardation film of any one of [1] to [6], which satisfies the relational expression below:

Re450/Re550<1 where, Re450 represents in-plane retardation at 450 nm, and Re550 represents in-plane retardation at 550 nm.

[8] The retardation film of any one of [1] to [7], which satisfies:

$nx>ny=nz$, where, nx represents a refractive index of an optically-anisotropic layer measured in the plane thereof and in the direction of the slow axis, ny represents a refractive index of the optically-anisotropic layer measured in the plane thereof and in the direction normal to nx, and nz represents a refractive index in the direction normal to nx and ny.

[9] The retardation film of any one of [1] to [8], in which the liquid crystal compound is fixed at a temperature 10° C. or more lower than the phase transition temperature between the nematic phase and the smectic phase.

[10] The retardation film of [9], wherein the liquid crystal compound is heated to a temperature not lower than the phase transition temperature between the nematic phase and the isotropic phase, and then fixed at a temperature 10° C. or more lower than the phase transition temperature between the nematic phase and the smectic phase.

[11] A method of manufacturing a retardation film of any one of [1] to [10], the method comprising coating a composition, which contains a liquid crystal compound capable of showing a smectic phase and a non-liquid crystal compound which satisfies the conditions A and B below, on a support, and then fixing the liquid crystal compound in the smectic phase:

molecular weight is 10000 or less; and    condition A:

$T0-T1 \leq 30°$ C.,    condition B:

where, T0 represents a phase transition temperature, in ° C., between a nematic phase and an isotropic phase, of a composition which contains the liquid crystal compound showing the smectic phase, and does not contain the non-liquid crystal compound, and T1 represents a phase transition temperature, in ° C., between a nematic phase and an isotropic phase, of a composition which contains the liquid crystal compound showing the smectic phase, and 6% by mass, relative to the mass of the liquid crystal compound, of tthe non-liquid crystal compound.

[12] The method of manufacturing a retardation film of [11], wherein the liquid crystal compound is fixed at a temperature 10° C. or more lower than the phase transition temperature between the nematic phase and the smectic phase.

[13] The method of manufacturing a retardation film of [12], wherein the liquid crystal compound is heated to a temperature not lower than the phase transition temperature between the nematic phase and the isotropic phase, and then fixed at a temperature 10° C. or more lower than the phase transition temperature between the nematic phase and the smectic phase.

[14] The method of manufacturing a retardation film of any one of [11] to [13], wherein the liquid crystal compound is heated to 40° C. to 200° C., and then fixed at 25° C. to 120° C.

[15] A laminate comprising the retardation film of any one of [1] to [10] and a second retardation film.

[16] The laminate of [15], wherein the second retardation film satisfies:

$nx>ny=nz$, where, nx represents a refractive index of an optically-anisotropic layer measured in the plane thereof and in the direction of the slow axis, ny represents a refractive index of the optically-anisotropic layer measured in the plane thereof and in the direction normal to nx, and nz represents a refractive index in the direction normal to nx and ny.

[17] A composition comprising a liquid crystal compound which shows a smectic phase, and a non-liquid crystal compound which satisfies the conditions A and B below:

molecular weight is 10000 or less; and    condition A:

$T0-T1 \leq 30°$ C.,    condition B:

where, T0 represents a phase transition temperature, in ° C., between a nematic phase and an isotropic phase, of a composition which contains the liquid crystal compound showing the smectic phase, and does not contain that non-liquid crystal compound, and T1 represents a phase transition temperature, in ° C., between a nematic phase and an isotropic phase, of a composition which contains the liquid crystal compound showing the smectic phase, and 6% by mass, relative to the mass of the liquid crystal compound, of the non-liquid crystal compound.

[18] A polarizing plate comprising a polarizer, and the retardation film of any one of [1] to [10] or the laminate of [15].

[19] The polarizing plate of [18], wherein the retardation film resides on the surface of the polarizer, or a film having thickness of 10 μm or thinner resides between the polarizer and the retardation film.

[20] The polarizing plate of [18], which is obtained by coating the composition of [17] over the surface of a polarizer, and by fixing the liquid crystal compound.

[21] A liquid crystal display device comprising the retardation film of any one of [1] to [10], the laminate of [15] or [16], or the polarizing plate of any one of [18] to [20].

According to this invention, there is provided a retardation film having a suppressed streak defect and showing good front contrast when incorporated into the liquid crystal display device, and, a laminate, a polarizing plate and a liquid crystal display device using the same. According to the method of manufacturing a retardation film and the composition of the present invention, the above-described retardation film can be manufactured.

DESCRIPTION OF EMBODIMENTS

Figure 1:
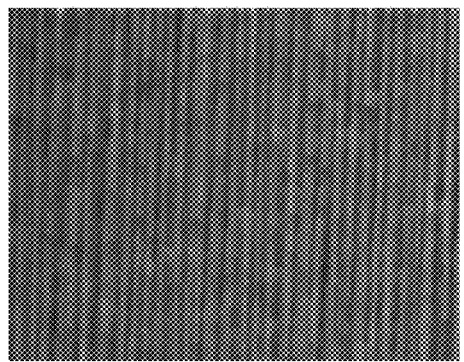
FIG. 1 is a drawing illustrating a streak defect observed in a polarized microphotograph.

This invention will be detailed below. Although the description below regarding constituent features may be made on representative embodiments of this invention, this invention is not limited to these embodiments. In this specification, all numerical ranges given in the form of "to" preceded and succeeded by numerals are defined to contain these numerals as the lower and upper limit values. Wordings of "normal" and "parallel" regarding angle are now interpreted to mean ranges given by (strict angle ±10°), and "same" or "different" angle may be determined based on whether the difference is smaller than 5° or not. The solid content means that measured at 25° C.

The phase transition temperature between a nematic phase and an isotropic phase and the phase transition temperature between a smectic phase and a nematic phase mean the phase transition temperature under decreasing temperature respectively, unless otherwise stated.

In this specification, Re(λ) and Rth(λ) represent in-plane retardation and thickness-direction retardation at a wavelength of λ, respectively. Re(λ) may be measured using KOBRA21ADH or WR (trade name, from Oji Scientific Instruments), by making light having a wavelength of λ nm incident on the film in the direction of the normal line.

If the film to be measured is represented by a uniaxial or biaxial indicatrix, Rth(λ) may be calculated by the method below.

In the calculation of Rth(λ), Re(λ) is measured while varying the angle of inclination of an incident light of λ nm in wavelength, over the range which starts at the normal line direction on the film up to 50° inclination on one side at 10-degree steps, at 6 points in total, assuming the in-plane slow axis (determined by KOBRA21ADH) as the axis of inclination (axis of rotation) (for the film having no slow axis, an arbitrary in-plane direction is assumed as the axis of rotation), and Rth(λ) is then calculated by KOBRA 21ADH or WR based on the thus-measured retardation values, a hypothetical value of average refractive index, and an entered value of the thickness of film.

For the film showing a retardation value of zero at a certain angle of inclination away from the normal line direction, while assuming the in-plane slow axis as the axis of rotation, all retardation values measured at angles larger than such angle of inclination will be assigned with the negative sign, and Rth will be calculated by KOBRA21ADH or WR. Rth may alternatively be calculated by measuring retardation values in two arbitrarily-inclined directions while assuming the slow axis as the axis of inclination (axis of rotation) (for the film having no slow axis, an arbitrary in-plane direction is assumed as the axis of rotation), and Rth(λ) is then calculated based on the thus-measured values, a hypothetical value of average refractive index, and an entered value of the thickness of film, according to the Mathematical Formula (1) and Mathematical Formula (2) below.

$$Re(\theta) = \left[nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}}\right] \times \frac{d}{\cos\left\{\sin^{-1}\left(\frac{\sin(-\theta)}{nx}\right)\right\}}$$

Mathematical Formula (1)

$$Rth = \left(\frac{nx + ny}{2} - nz\right) \times d$$

Mathematical Formula (2)

Now, Re(θ) represents a retardation value measured in the direction inclined by angle θ away from the normal line direction. nx represents the refractive index in the direction of slow axis in plane, ny represents the refractive index in the direction normal to nx in plane, and nz represents the refractive index in the direction normal to nx and ny. d represents the thickness of film.

For the film to be measured which can neither be represented by a uniaxial indicatrix nor a biaxial indicatrix, which is so called a film having no optic axis, Rth(λ) may be calculated by the method below.

In the calculation of Rth(λ), Re(λ) is measured while varying the angle of inclination of an incident light of λ nm in wavelength, over the range from −50° to 50° on both sides of the normal line direction on the film, at 10-degree steps and therefore 11 points in total, assuming the in-plane slow axis (determined by KOBRA21ADH or WR) as the axis of inclination (axis of rotation), and Rth(λ) is then calculated by KOBRA21 ADH or WR based on the thus-measured retardation values, a hypothetical value of average refractive index, and an entered value of the thickness of film.

In the measurement, the hypothetical value of average refractive index can be referred to Polymer Handbook (John Wiley & Sons, Inc.) and catalog-listed values of various optical films. As for an optical film with the average refractive index thereof unknown, the average refractive index can be measured using an Abbe's refractometer. Values of the average refractive index of major optical films are given below: cellulose acylate (1.48), cycloolefin polymer (1.52), polycarbonate (1.59), polymethyl methacrylate (1.49), and polystyrene (1.59). When entered with the hypothetical values of average refractive index and the thickness of film, KOBRA21ADH or WR calculates nx, ny and nz. Using such calculated nx, ny and nz, Nz=(nx-nz)/(nx-ny) is further calculated.

The retardation may alternatively be measured using AxoScan (from Axometrics, Inc.).

<Retardation Film>

The retardation film of this invention is such that the liquid crystal compound capable of showing a smectic phase is fixed in the smectic phase, and contains a non-liquid crystal compound which satisfies the conditions A and B below:

molecular weight is 10000 or less; and    condition A:

$T0-T1 \leq 30°$ C.,    condition B:

where, T0 represents the phase transition temperature, in ° C., between the nematic phase and the isotropic phase, of a composition which contains the liquid crystal compound showing the smectic phase, and does not contain the non-liquid crystal compound, and T1 represents the phase transition temperature, in ° C., between the nematic phase and the isotropic phase, of a composition which contains the liquid crystal compound showing the smectic phase, and 6% by mass, relative to the mass of the liquid crystal compound, of the non-liquid crystal compound.

The liquid crystal compound capable of showing a smectic phase may be formed into an optically-anisotropic layer, after aligned in a near-horizontal manner, followed by fixation by polymerization, photo-crosslinking or thermal crosslinking. The near-horizontal alignment means that, assuming the in-plane direction of the film plane as the horizontal direction, an average tilt angle of the liquid crystal molecule away from the horizontal direction falls within the range from 0° to 45°. Since the smectic liquid crystal causes only a small depolarized scattering due to fluctuation in orientation, so that it may suitably be used when there is a need for a relatively large retardation of 100 nm or above. The smectic phase is any of smectic-A (SmA) phase, smectic-B (SmB) phase, smectic-C (SmC) phase, or any phase of higher order without special limitation, wherein the SmA phase is particularly preferable.

Whether the liquid crystal compound is fixed in the smectic phase or not may be confirmed by observing X-ray diffractometric pattern. If fixed in the smectic phase, an X-ray diffractometic pattern assignable to the ordered layer will be observed, based on which the state of fixation may be determined.

The thickness of the retardation film of this invention is 0.1 μm to 10 μm although variable depending on materials to be used or desired value of retardation, more preferably 0.1 μm to 5 μm, and even more preferably 1 μm to 5 μm.

Re550 of the retardation film of this invention is preferably 10 to 400 nm, although variable depending on applications, and more preferably 100 to 300 nm.

Rth550 of the retardation film of this invention is preferably determined, but not specifically limited, so that nz coefficient, given by (Rth/Re)+0.5, falls in the range from 0.8 to 1.2, and is most preferably equals to 1.0.

For the case where the retardation film of this invention is intended to be combined with a positive C-plate to give a laminate, the retardation of the retardation film preferably satisfies 100 nm≤Re550≤180 nm, although the optimum value of which is variable depending on the C-plate to be combined, more preferably satisfies 100 nm≤Re550≤150 nm, and even more preferably satisfies 120 nm≤Re550≤140 nm Rth550, again variable depending on applications, preferably satisfies 30 nm≤Rth550≤100 nm, more preferably satisfies 40 nm≤Rth550≤90 nm, and even more preferably satisfies 50 nm≤Rth550≤80 nm.

The retardation film of this invention preferably satisfies the relational expression below:

Re450/Re550≤1

The retardation film of this invention is preferably a positive A-plate which satisfies nx>ny=nz. nx represents the refractive index in the direction of slow axis in the plane of optically-anisotropic layer, ny represents the refractive index in the direction normal to nx in the plane of optically-anisotropic layer, and nz represents the refractive index in the direction normal to nx and ny.

The retardation film of this invention may be manufactured by using a composition which contains the liquid crystal compound capable of showing a smectic phase, and a non-liquid crystal compound explained below. Also the composition per se falls in the scope of this invention.

The retardation film of this invention is formed using the composition, in which the liquid crystal compound is preferably fixed at a temperature 10° C. or more lower than the phase transition temperature between the nematic phase and the smectic phase, and the liquid crystal compound is more preferably heated to a temperature not lower than the phase transition temperature between the nematic phase and the isotropic phase, and then fixed at a temperature 10° C. or more lower than the phase transition temperature between the nematic phase and the smectic phase. The method of manufacturing the retardation film of this invention will be detailed later.

<Composition>

The composition of this invention contains the liquid crystal compound capable of showing a smectic phase, and the non-liquid crystal compound which satisfies the conditions conditions A and B described below. The retardation film of this invention may be manufactured by using the composition of this invention.

The composition of this invention preferably has a phase transition temperature between the nematic phase and the smectic phase (also referred to as "TSmN", hereinafter) of 100° C. or lower, more preferably 80° C. or lower, and even more preferably 60° C. or lower. The TSmN is preferably 25° C. or higher, more preferably 35° C. or higher, and even more preferably 45° C. or higher.

The non-liquid crystal compound and the liquid crystal compound capable of showing a smectic phase will be explained below.

<<Non-Liquid Crystal Compound>>

The non-liquid crystal compound used in this invention satisfies the conditions A and B below:

molecular weight is 10000 or less; and     condition A:

T0−T1≤30° C.,     condition B:

where, T0 represents the phase transition temperature, in ° C., between the nematic phase and the isotropic phase, of a composition which contains the liquid crystal compound showing the smectic phase, and does not contain the no non-liquid crystal compound.

T1 represents the phase transition temperature, in ° C., between the nematic phase and the isotropic phase, of a composition which contains the liquid crystal compound showing the smectic phase, and 6% by mass, relative to the mass of the liquid crystal compound, of the non-liquid crystal compound.

Note that the composition which contains, as described in the definition of T0, the liquid crystal compound capable of showing a smectic phase, and does not contain the non-liquid crystal compound; and the composition which contains, as described in the definition of T1, the liquid crystal compound capable of showing a smectic phase, and 6% by mass, relative to the mass of the liquid crystal compound, of a non-liquid crystal compound, have the same chemical composition except that the non-liquid crystal compound is contained or not.

The phase transition temperature between the nematic phase and the isotropic phase may be measured by coating the composition over a glass plate or a base having a treated surface for alignment control, and observing it on a temperature-controllable heating stage under a polarization microscope.

A molecular weight of the non-liquid crystal compound is not particularly limited so long as the molecular weight is 10000 or less, and the molecular weight is preferably 2000 or less, more preferably 1000 or less, and even more preferably 500 or less. Although the lower limit of the molecular weight of the non-liquid crystal compound is not specifically limited, it is preferably 100 or more in general. With the molecular weight controlled in these ranges, the non-liquid crystal compound will have an advantage that it is less liable to cause phase separation from the liquid crystal compound capable of showing a smectic phase.

The non-liquid crystal compound satisfies T0-T1≤30° C., preferably satisfies T0-T1≤25° C., more preferably satisfies T0-T1≤15° C., even more preferably satisfies T0-T1≤10° C., and particularly satisfies T0-T1≤5° C. With the non-liquid crystal compound satisfying the condition B, the streak defect specific to the smectic liquid crystal may be suppressed, and thereby a good front contrast will be obtained when incorporated into the liquid crystal display device.

The melting point of the non-liquid crystal compound is preferably lower than the phase transition temperature between the nematic phase and the smectic phase of the composition. With such configuration, the liquid crystal compound capable of showing a smectic phase may be suppressed from crystallizing. The melting point of the non-liquid crystal compound is preferably 10° C. or more lower than the phase transition temperature between the nematic phase and the smectic phase of the composition. The melting point of the non-liquid crystal compound may be measured by the capillary method (JIS K0064).

In one embodiment of the present invention, the non-liquid crystal compound preferably satisfies the conditions C and D below:

boiling point>T0; and  condition C:

$T0'-T1'≤15°$ C.,  condition D:

where T0 is as defined in the definition of condition B, T0' represents a phase transition temperature, in ° C., between a smectic phase and a nematic phase, of a composition which contains the liquid crystal compound showing the smectic phase, and does not contains the non-liquid crystal compound, and T1' represents a phase transition temperature, in ° C., between a smectic phase and a nematic phase, of a composition which contains the liquid crystal compound showing the smectic phase, and 6% by mass, relative to the mass of the liquid crystal compound, of the non-liquid crystal compound.

Note that the composition which contains, as described in the definition of T0', the liquid crystal compound capable of showing a smectic phase, and does not contain the non-liquid crystal compound; and the composition which contains, as described in the definition of T1', the liquid crystal compound capable of showing a smectic phase, and 6% by mass, relative to the mass of the liquid crystal compound, of a non-liquid crystal compound, have the same chemical composition except that the non-liquid crystal compound is contained or not.

The phase transition temperature between the smectic phase and the nematic phase may be measured by coating the composition over a glass plate or a base having a treated surface for alignment control, and observing it on a temperature-controllable heating stage under a polarization microscope.

The non-liquid crystal compound preferably satisfies T0'-T1'≤15° C., more preferably satisfies T0'-T1'≤10° C., and still more preferably satisfies T0'-T1'≤5° C.

With the non-liquid crystal compound satisfying the conditions C and D, the streak defect specific to the smectic liquid crystal may be suppressed, and thereby a good front contrast will be obtained when incorporated into the liquid crystal display device. By adding the non-liquid crystal compound satisfying the conditions C and D, the dynamics of the liquid crystal in nematic phase is increased, and the potential of alignment of liquid crystal is increased, while the alignment of liquid crystal in smectic phase is considered not to be inhibited. It is presumed that, for the aforementioned reason, a good front contrast is obtained. However, the present invention is not limited by the presumed mechanism as mentioned above.

In another embodiment of the present invention, the non-liquid crystal compound preferably has a bridged cyclic structure. The bridged cyclic structure is preferably a saturated or unsaturated aliphatic hydrocarbon ring having a bridged cyclic structure, and more preferably a saturated aliphatic hydrocarbon ring having a bridged cyclic structure. The bridged cyclic structure is preferably aliphatic hydrocarbon ring having two or more rings, and more preferably aliphatic hydrocarbon ring having two, three or four rings. The aliphatic hydrocarbon ring may have a substituent (preferably a substituent defined by $R^1$ to $R^7$ described later).

The bridged cyclic structure preferably has a bicyclo[2.2.1]heptane skeleton, bicyclo[5.3.0]decane skeleton, bicyclo[4.3.0]nonane skeleton, bicyclo[3.2.1]octane skeleton, tricyclo[5.2.1.0$^{2,6}$]decane skeleton, tricyclo[3.3.1.1$^{3,7}$]decane skeleton (adamantyl structure), or tricyclo[6.2.1.0$^{2,7}$]undecane skeleton, wherein tricyclo[3.3.1.1$^{3,7}$]decane skeleton (adamantyl structure) is particularly preferable.

The non-liquid crystal compound is preferably represented by Formula below.

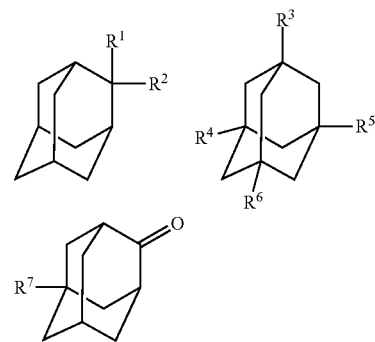

In the formulae, each of $R^1$ and $R^2$ independently represents a hydrogen atom, polymerizable group, -(linking group)-(polymerizable group), hydroxy group, alkyl group having 1 to 6 carbon atoms, or amino group, each of $R^3$, $R^4$, $R^5$ and $R^6$ independently represents a hydrogen atom; polymerizable group; -(linking group)-(polymerizable group); carboxy group; hydroxy group; alkyl group having 1 to 6 carbon atoms, which may be substituted by hydroxy group, carboxy group or amino group; halogen atom; aryl group having 6 to 12 carbon atoms, which may be substituted by alkyl group having 1 to 6 carbon atoms or hydroxy group; acyl group having 1 to 6 carbon atoms; cyano group; —COOR$^{11}$ (where, R$^{11}$ represents an alkyl group having 1 to 6 carbon atoms); —COCl; amino group; —NH—$(CH_2)_n$—$NH_2$ (n represents an integer of 1 to 5); heterocyclic group, —NHCO—$R^{12}$ (where, $R^{12}$ represents an alkyl group having 1 to 6 carbon atoms); —NCS; or —NHC(=S)$NH_2$, and $R^7$ represents a hydrogen atom or hydroxy group.

The polymerizable group is preferably an acryloyl group or methacryloyl group. The linking group is preferably —O—, alkylene group having 1 to 6 carbon atoms, or combination of them, wherein —O— or —C($CH_3$)$_2$—O— is particularly preferable.

Specific examples of the non-liquid crystal compound will be shown below, without limiting the invention. From the viewpoint of accelerating curing of the retardation film, and of suppressing changes in retardation, the non-liquid crystal compound preferably has a polymerizable group such as acryloyl group or methacryloyl group.

M-1
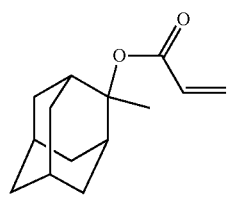

M-2
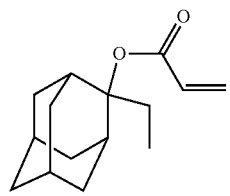

M-3
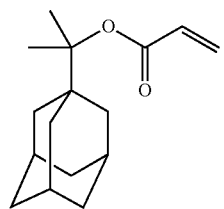

M-4
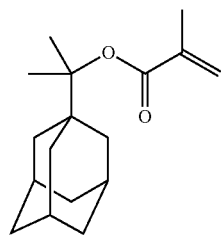

M-5
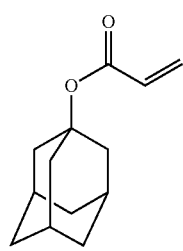

M-6
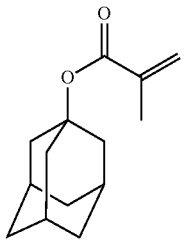

M-7
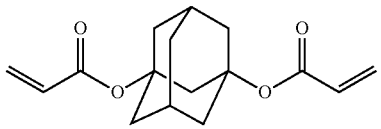

M-8
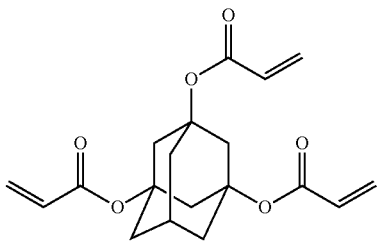

M-9
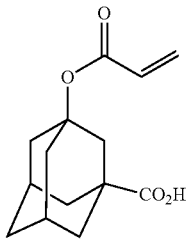

M-10
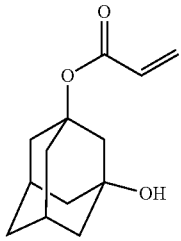

M-11
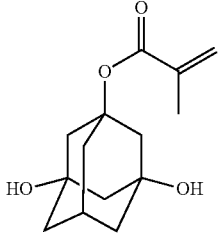

M-12
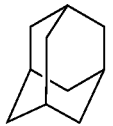

M-13 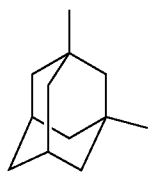
M-14 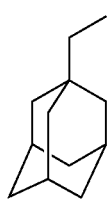
M-15 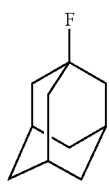
M-16 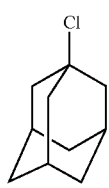
M-17 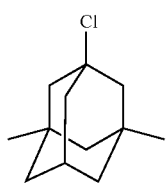
M-18 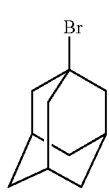
M-19 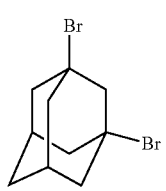
M-20 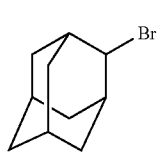
M-21 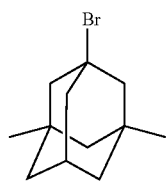
M-22 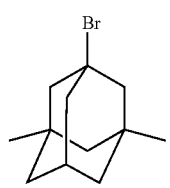
M-23 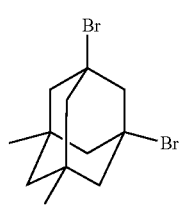
M-24 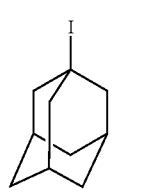
M-25 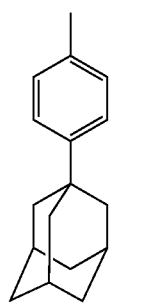
M-26 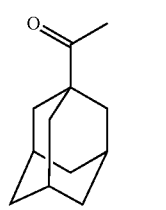
M-27 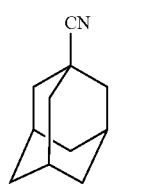
M-28 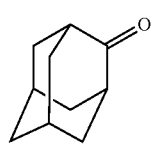

-continued
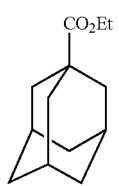
M-29
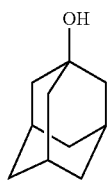
M-30
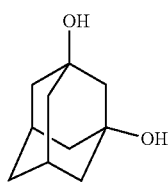
M-31
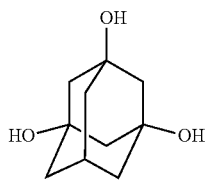
M-32
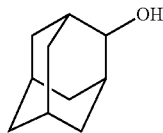
M-33
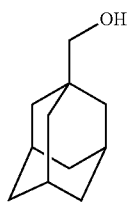
M-34
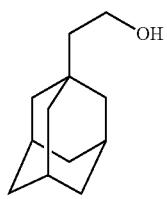
M-35
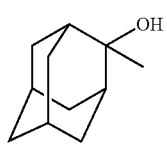
M-36
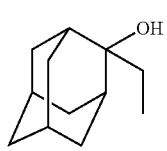
M-37
-continued
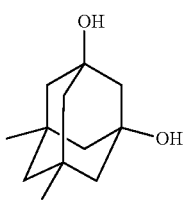
M-38
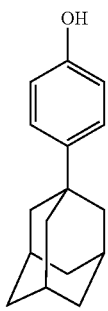
M-39
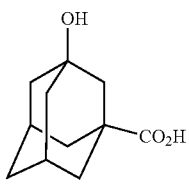
M-40
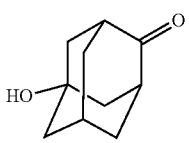
M-41
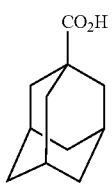
M-42
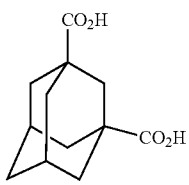
M-43
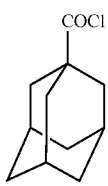
M-44
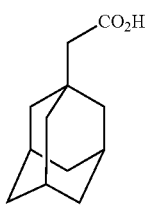
M-45

-continued

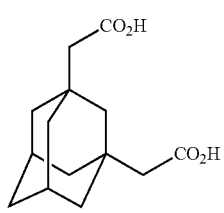
M-46

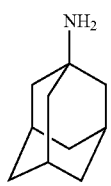
M-47

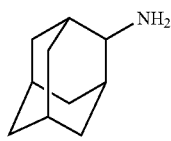
M-48

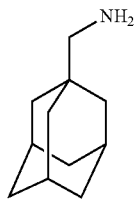
M-49

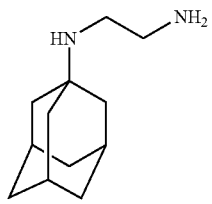
M-50

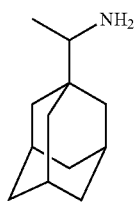
M-51

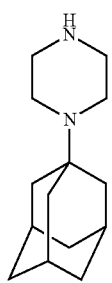
M-52

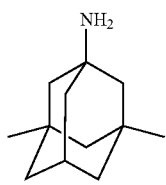
M-53

-continued

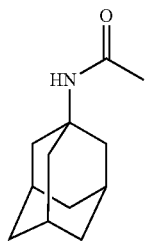
M-54

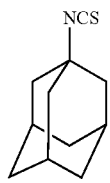
M-55

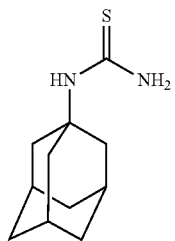
M-56

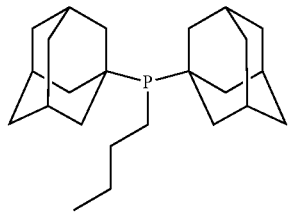
M-57

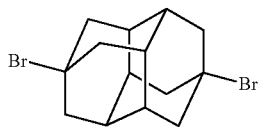
M-58

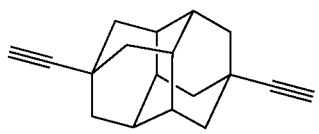
M-59

Bis[2-(2-methoxyethoxy)ethyl]ether:
$CH_3O-CH_2-CH_2-O-CH_2-CH_2-O-CH_2-CH_2-O-CH_2-CH_2-OCH_3$
Bis(2-butoxyethyl)ether:
$CH_3(CH_2)_3-O-CH_2-CH_2-O-CH_2-CH_2-O-(CH_2)_3CH_3$
APG-200 (from Shin-Nakamura Chemical Co., Ltd.):
$CH_2=CHCOO-(CH(CH_3)CH_2O)_m-(CH_2CH(CH_3)O)_nOCCH=CH_2 (m+n=3)$
A-200 (from Shin-Nakamura Chemical Co., Ltd.):
$CH_2=CH-CO-O(CH_2-CH_2O)_nOC-CH=CH_2 (n=4)$ The content of the non-liquid crystal compound having a molecular weight of 10000 or less is preferably 0.1 to 20% by mass of the total solids in the composition, and is more preferably 1 to 10% by mass.

«Liquid Crystal Compound»

The liquid crystal compound is preferably represented by Formula (II) below:

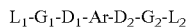

Formula (II)

In the formula, each of $D_1$ and $D_2$ independently represents —CO—O—, —O—CO—, —C(=S)O—, —O—C(=S)—, —$CR^1R^2$—, —$CR^1R^2$—$CR^3R^4$—, —O—$CR^1R^2$—, —$CR^1R^2$—O—$CR^1R^2$—O—$CR^3R^4$—, —$CR^1R^2$—O—CO—, —O—CO—$CR^1R^2$—, —$CR^1R^2$—O—CO—$CR^3R^4$—, —$CR^1R^2$—CO—O—$CR^3R^4$—, —$NR^1$—$CR^2R^3$—, —$CR^1R^2$—$NR^3$—, —CO—$NR^1$—, or —$NR^1$—CO—, and each of $R^1$, $R^2$, $R^3$ and $R^4$ independently represents a hydrogen atom, halogen atom, or alkyl group having 1 to 4 carbon atoms, each of $G_1$ and $G_2$ independently represents a divalent alicyclic hydrocarbon group having 5 to 8 carbon atoms, a methylene group contained in the alicyclic hydrocarbon group may be substituted by —O—, —S—, —NH— or —NH—, each of $L_1$ and $L_2$ independently represents a monovalent organic group, at least one species selected from the group consisting of $L_1$ and $L_2$ represents a monovalent group having a polymerizable group, Ar represents a divalent aromatic ring group represented by Formula (II-1), (II-2), (II-3) or (II-4) below:

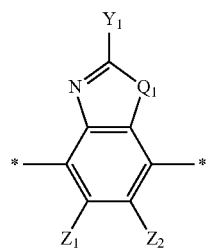

(II-1)

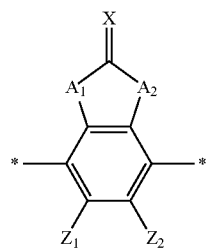

(II-2)

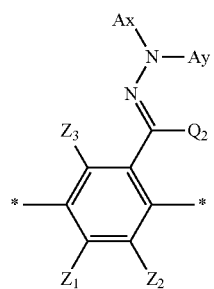

(II-3)

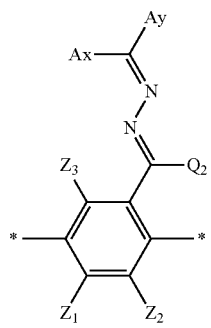

(II-4)

In Formulae (II-1) to (II-4), $Q_1$ represents —S—, —O—, or $NR^{11}$—, $R^{11}$ represents a hydrogen atom or alkyl group having 1 to 6 carbon atoms, $Y_1$ represents an aromatic hydrocarbon group having 6 to 12 carbon atoms, or, aromatic heterocyclic group having 3 to 12 carbon atoms, each of $Z_1$, $Z_2$, and $Z_3$ independently represents a hydrogen atom or aliphatic hydrocarbon group having 1 to 20 carbon atoms, alicyclic hydrocarbon group having 3 to 20 carbon atoms, monovalent aromatic hydrocarbon group having 6 to 20 carbon atoms, halogen atom, cyano group, nitro group, —$NR^{12}R^{13}$ or $SR^{12}$, $Z_1$ and $Z_2$ may mutually combine to form an aromatic ring or aromatic heterocycle, each of $R^{12}$ and $R^{13}$ independently represents a hydrogen atom or alkyl group having 1 to 6 carbon atoms, each of $A_1$ and $A_2$ independently represents a group selected from —O—, —$NR^{21}$— ($R^{21}$ represents a hydrogen atom or substituent), —S— and —CO—, X represents a hydrogen atom or optionally substituted Group XIV to XVI non-metal atom, Ax represents an organic group having 2 to 30 carbon atoms and having at least one aromatic ring selected from the group consisting of aromatic hydrocarbon ring and aromatic heterocycle, Ay represents a hydrogen atom, optionally substituted alkyl group having 1 to 6 carbon atoms, or, organic group having 2 to 30 carbon atoms, and having at least one aromatic ring selected from the group consisting of aromatic hydrocarbon ring and aromatic heterocycle, the aromatic ring possessed by Ax and Ay may have a substituent, Ax and Ay may mutually combine to form a ring, and $Q_2$ represents a hydrogen atom, or, optionally substituted alkyl group having 1 to 6 carbon atoms.

In Formula (II), the divalent alicyclic hydrocarbon group represented by $G^1$ and $G^2$ is preferably a five-membered ring or six-membered ring. Although the alicyclic hydrocarbon group may be saturated or unsaturated, saturated alicyclic hydrocarbon group is preferable. The divalent alicyclic hydrocarbon group represented by $G_1$ and $G_2$ may be referred to the description, for example, in paragraph [0078] of JP-A-2012-21068, the contents of which are incorporated into this specification.

In Formula (II), each of $L_1$ and $L_2$ independently represents a monovalent organic group, and each of $L_1$ or $L_2$ represents a monovalent group having a polymerizable group.

The polymerizable group is specifically exemplified by those having an ethylenic unsaturated group, such as vinyl group, vinyloxy group, styryl group, p-(2-phenylethenyl) phenyl group, acryloyl group, methacryloyl group, acryloyloxy group and methacryloyloxy group; and, carboxy group, acetyl group, hydroxy group, carbamoyl group, alkylamino group having 1 to 4 carbon atoms, amino group, oxiranyl group, oxetanyl group, formyl group, isocyanato group and isothiocyanato group.

The organic group $L_1$ is preferably a group represented by Formula (A1), and $L_2$ is preferably a group represented by Formula (A2).

In Formula (A1) and Formula (A2), each of $B^1$, $B^2$, $E^1$ and $E^2$ independently, represents —$CR^{11}R^{12}$—, —$CH_2$—$CH_2$—, —O—, —S—, —CO—O—, —O—CO—O—, —CS—O—, —O—CS—O—, —CO—$NR^{11}$—, —O—$CH_2$—, —S—$CH_2$— or single bond. Each of $R^{11}$ and $R^{12}$ represents a hydrogen atom or alkyl group having 1 to 4 carbon atoms.

In Formula (A1) and Formula (A2), each of $A^1$ and $A^2$ independently represents a divalent alicyclic hydrocarbon group having 5 to 8 carbon atoms or divalent aromatic hydrocarbon group having 6 to 18 carbon atoms. —$CH_2$— contained in the alicyclic hydrocarbon group may be substituted by —O—, —S— or —NH—, and —CH(-)- contained in the alicyclic hydrocarbon group may be substituted by —N(-)-. The divalent aromatic hydrocarbon groups represented by $A^1$ and $A^2$ are exemplified by monocyclic and polycyclic ones. They may be referred to the description, for example, in paragraph [0083] of JP-A-2012-21068, the contents of which are incorporated into this specification.

Each of k and l independently represents an integer of 0 to 3. When k is an integer of 2 or larger, a plurality of ($B^1$)s and ($A^1$)s may be same or different. When l is an integer of 2 or larger, a plurality of ($B^2$) and ($A^2$) may be same or different.

Each of $F^1$ and $F^2$ represents a divalent aliphatic hydrocarbon group having 1 to 12 carbon atoms.

Each of $P^1$ and $P^2$ represents a hydrogen atom or polymerizable group, and at least one of them represents a polymerizable group.

When $Y_1$ in Formula (II-2) represents an aromatic hydrocarbon group having 6 to 12 carbon atoms, it may be monocyclic or polycyclic. When $Y_1$ represents an aromatic heterocyclic group having 3 to 12 carbon atoms, it may be monocyclic or polycyclic.

When each of $A_1$ and $A_2$ in Formula (II-2) represents —$NR^{21}$—, the substituent represented by $R^{21}$ may be referred to the description, for example, in paragraphs [0035] to [0045] of JP-A-2008-107767, the contents of which are incorporated into this specification.

When X in Formula (II-2) represents an optionally substituted Group XIV to XVI non-metal atom, it may preferably exist in the form of =O, =S, =NR' or =C(R')R'. R' represents a substituent, and the substituent may be referred to the description, for example, in paragraphs [0035] to [0045] of JP-A-2008-107767, wherein nitrogen atom is preferable.

As for definition and preferable ranges for the individual substituents of the compound represented by Formula (II), $D_1$, $D_2$, $G_1$, $G_2$, $L_1$, $L_2$, $R^1$, $R^2$, $R^3$, $R^4$ and $X^1$, and, $Y_1$, $Z_1$, $Z_2$ may be respectively referred to the description on $D^1$, $D^2$, $G^1$, $G^2$, $L^1$, $L^2$, $R^4$, $R^5$, $R^6$, $R^7$, $X^1$, $Y^1$, $Q^1$ and $Q^2$ of a compound represented by Formula (A) described in JP-A-2012-21068; $A_1$, $A_2$ and X may be respectively referred to the description on $A_1$, $A_2$ and X of a compound represented by Formula (I) described in JP-A-2008-107767; and, Ax, Ay and $Q_2$ may be respectively referred to the description on Ax, Ay and $Q^1$ of a compound represented by Formula (I) described in WO2013/018526. $Z_3$ may be referred to the description on $Q^1$ of compound (A) described in JP-A-2012-21068.

Preferable examples of the compound represented by Formula (II) will be enumerated below, without limiting this invention.

II-1-1

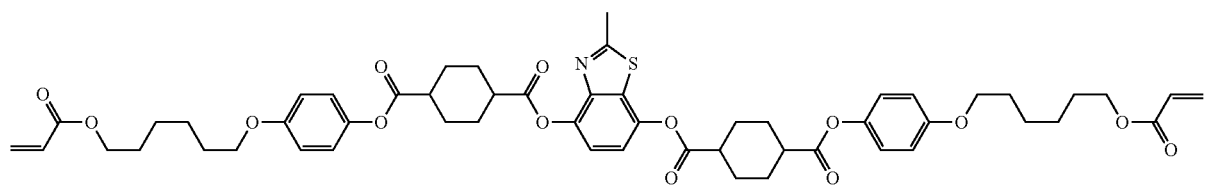

II-1-2

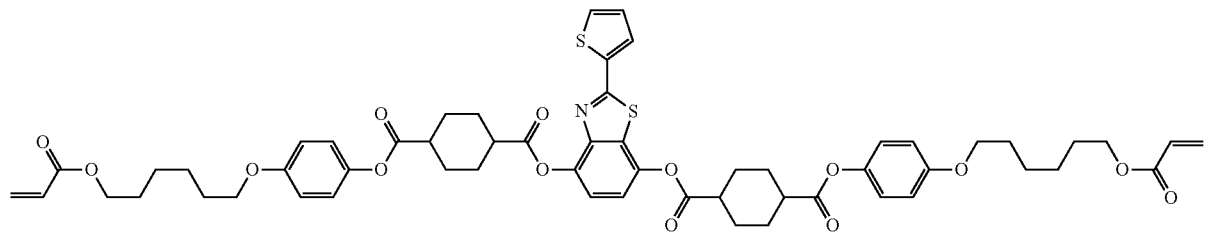

II-2-1

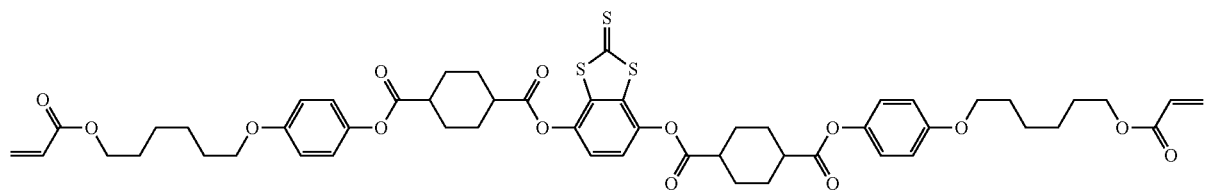

-continued
II-2-2
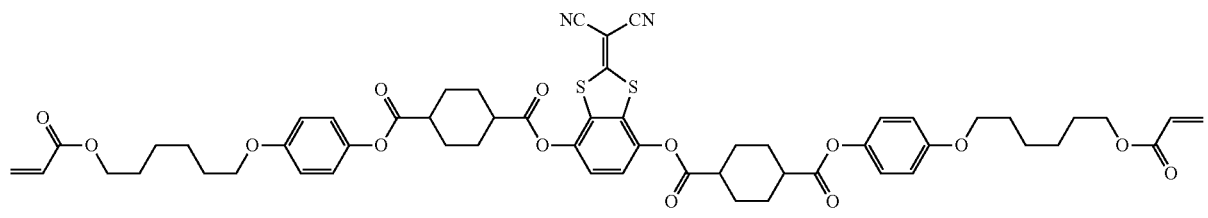
II-2-3
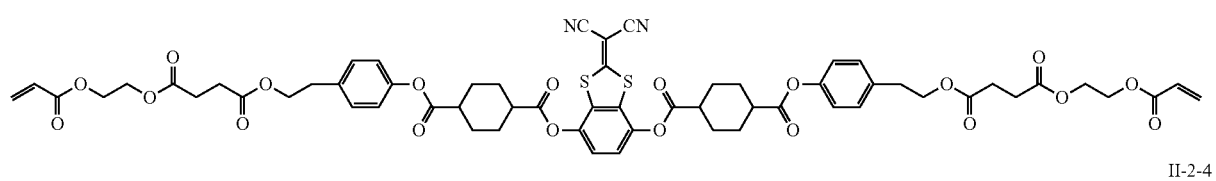
II-2-4
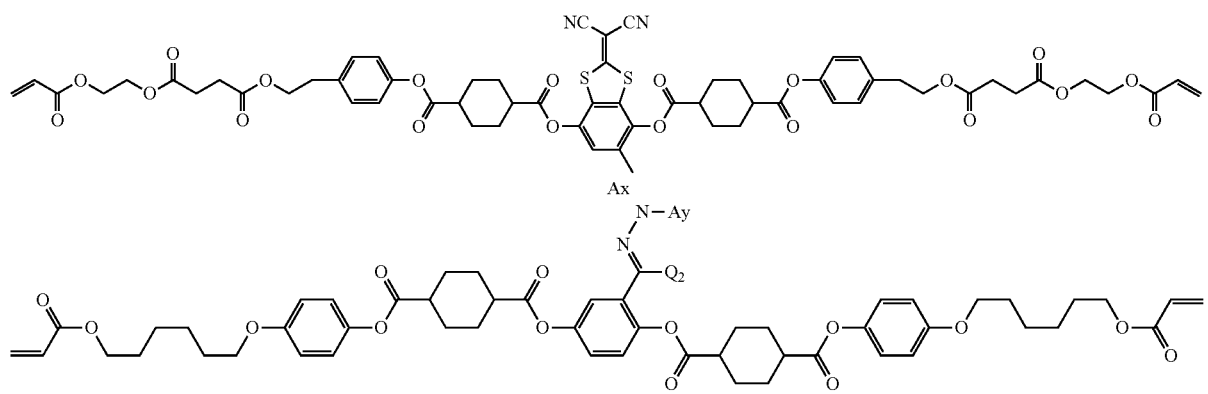
| No | Ax | Ay | Q2 |
|---|---|---|---|
| II-3-1 | benzothiazol-2-yl | H | H |
| II-3-2 | benzoxazol-2-yl | H | H |
| II-3-3 | naphthalen-1-yl | H | H |
| II-3-4 | Ph | Ph | H |
| II-3-5 | quinolin-2-yl | H | H |
| II-3-6 | phthalazin-1-yl | H | H |
| II-3-7 | benzothiazol-2-yl | $CH_3$ | H |
| II-3-8 | benzothiazol-2-yl | $C_4H_9$ | H |
| II-3-9 | benzothiazol-2-yl | $C_6H_{13}$ | H |
| II-3-10 | benzothiazol-2-yl | acryloyl | H |
| II-3-11 | benzothiazol-2-yl | benzothiazol-2-yl | H |
| II-3-12 | benzothiazol-2-yl | $CH_2CN$ | H |

TABLE 1-continued

| No | Ax | Ay | Q2 |
|---|---|---|---|
| II-3-13 | benzothiazol-2-yl | cyclohexyl | H |
| II-3-14 | benzothiazol-2-yl | *-CH2CH(CH3)2 (isobutyl) | H |
| II-3-15 | benzothiazol-2-yl | CH2CH2OH | H |
| II-3-16 | fluoren-9-yl | H | H |
| II-3-17 | benzothiazol-2-yl | CH2CF3 | H |
| II-3-18 | benzothiazol-2-yl | H | CH3 |
| II-3-19 | benzothiazol-2-yl | cyclohexyl | H |
| II-3-20 | benzothiazol-2-yl | *-(CH2)3-CN | H |
| II-3-21 | benzothiazol-2-yl | benzyl | H |
| II-3-22 | benzothiazol-2-yl | *-S(O)2-C6H5 | H |
| II-3-23 | benzothiazol-2-yl | *-CH2OCH2CH2OCH3 | H |
| II-3-24 | benzothiazol-2-yl | *-C(O)-C3H7 | H |
| II-3-25 | naphtho[1,2-d]thiazol-2-yl | C6H13 | H |

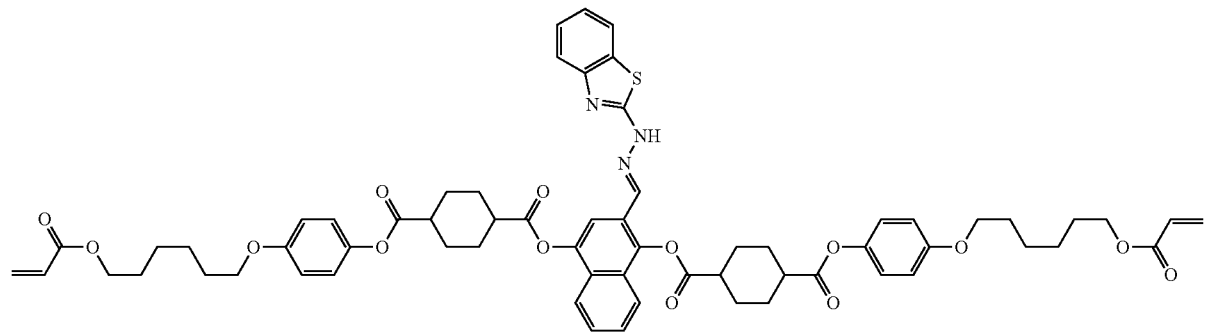

II-3-26

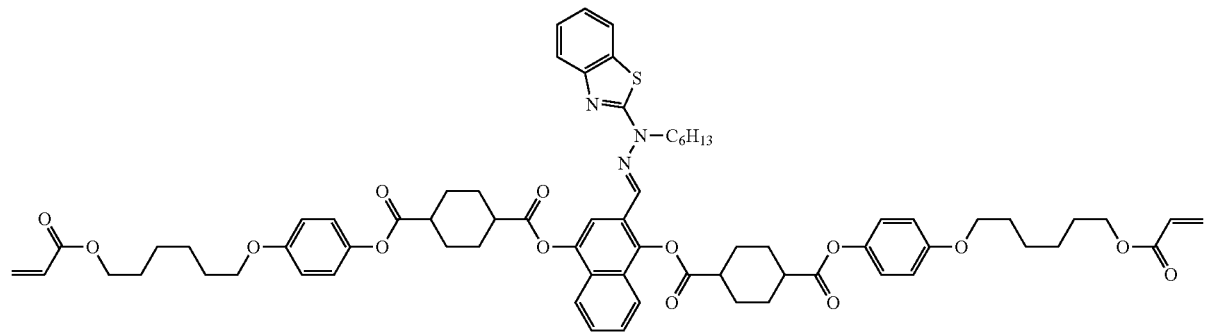

II-3-27

-continued
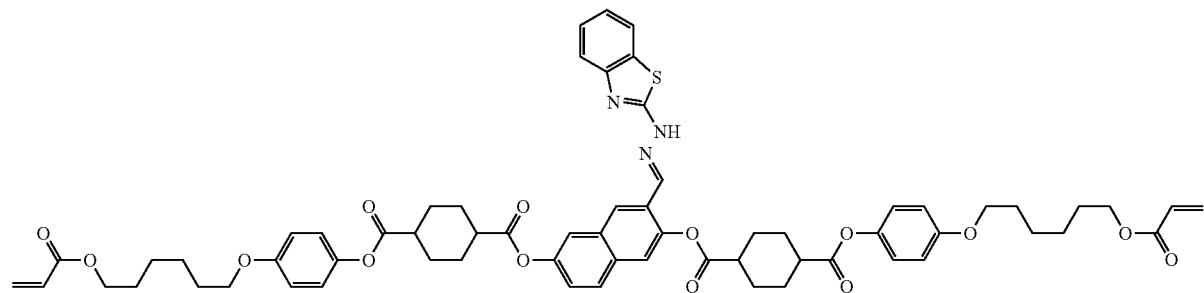
II-3-28
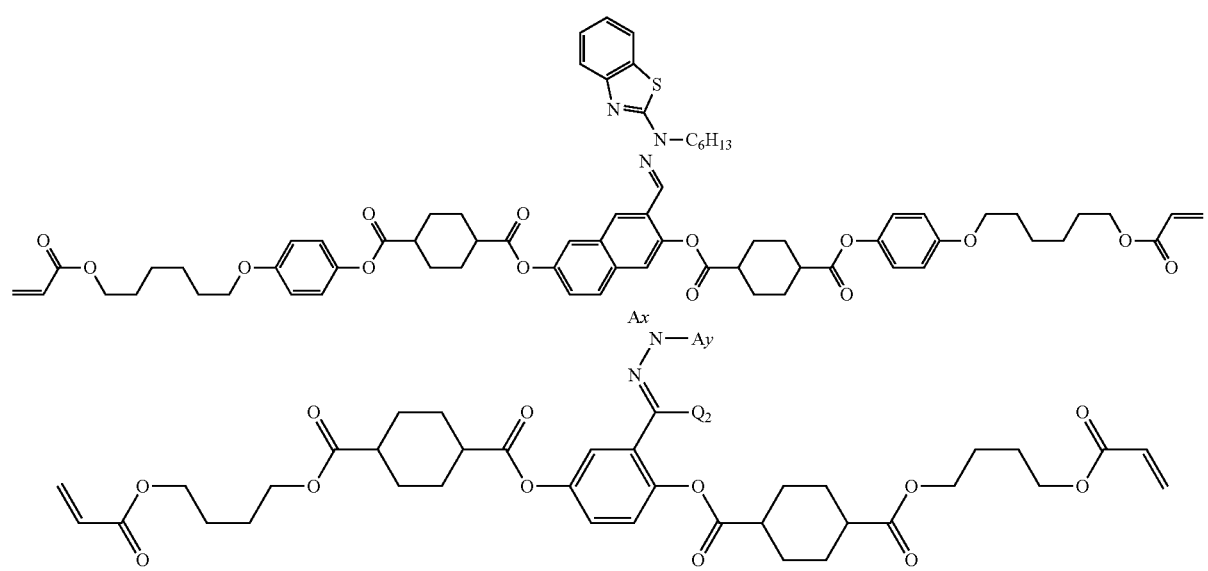
II-3-29
TABLE 2
| No | Ax | Ay | Q2 |
|---|---|---|---|
| II-3-30 | benzothiazol-2-yl | H | H |
| II-3-31 | benzoxazol-2-yl | H | H |
| II-3-32 | naphth-1-yl | H | H |
| II-3-33 | Ph | Ph | H |
| II-3-34 | quinolin-2-yl | H | H |
TABLE 2-continued
| No | Ax | Ay | Q2 |
|---|---|---|---|
| II-3-35 | phthalazin-1-yl | H | H |
| II-3-36 | benzothiazol-2-yl | CH$_3$ | H |
| II-3-37 | benzothiazol-2-yl | C$_4$H$_9$ | H |
| II-3-38 | benzothiazol-2-yl | C$_6$H$_{13}$ | H |
| II-3-39 | benzothiazol-2-yl | acryloyl | H |

TABLE 2-continued

| No | Ax | Ay | Q2 |
|---|---|---|---|
| II-3-40 | benzothiazol-2-yl | benzothiazol-2-yl | H |
| II-3-41 | benzothiazol-2-yl | CH₂CN | H |
| II-3-42 | benzothiazol-2-yl | cyclohexyl | H |
| II-3-43 | benzothiazol-2-yl | isopentyl | H |
| II-3-46 | benzothiazol-2-yl | CH₂CH₂OH | H |
| II-3-45 | fluoren-9-yl | H | H |
| II-3-46 | benzothiazol-2-yl | CH₂CF₃ | H |
| II-3-47 | benzothiazol-2-yl | H | CH₃ |
| II-3-48 | benzothiazol-2-yl | cyclohexylmethyl | H |
| II-3-49 | benzothiazol-2-yl | *(CH₂)₃CN | H |
| II-3-50 | benzothiazol-2-yl | benzyl | H |
| II-3-51 | benzothiazol-2-yl | *-SO₂-C₆H₄-CH₃ (p-tolylsulfonyl) | H |
| II-3-52 | benzothiazol-2-yl | *-CH₂-O-CH₂CH₂-O-CH₃ | H |
| II-3-53 | benzothiazol-2-yl | *-C(O)-CH₂CH₂CH₃ | H |
| II-3-54 | naphtho[1,2-d]thiazol-2-yl | C₆H₁₃ | H |

II-3-55

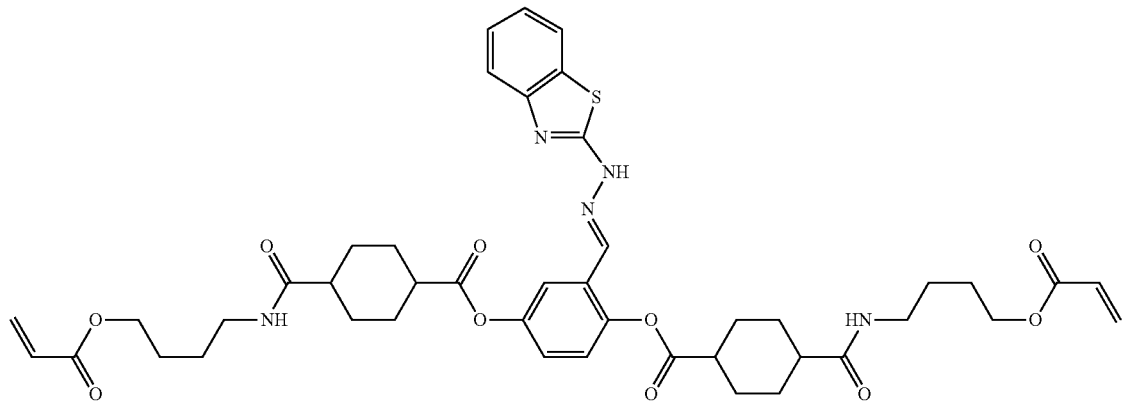

II-4-1

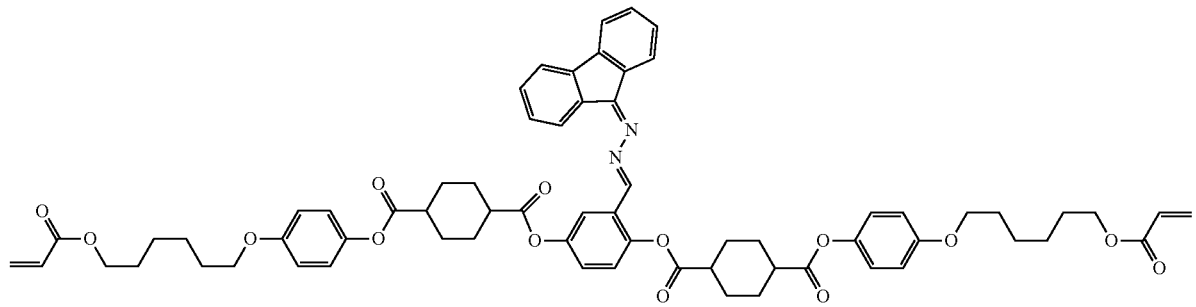

II-4-2

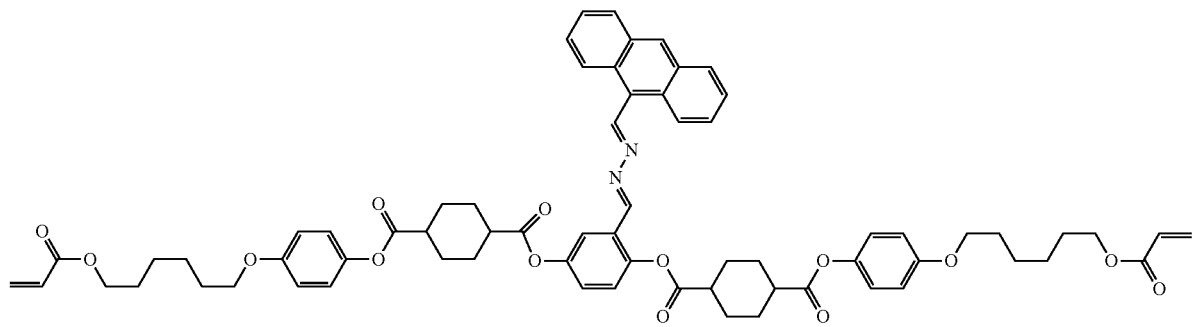

II-4-3

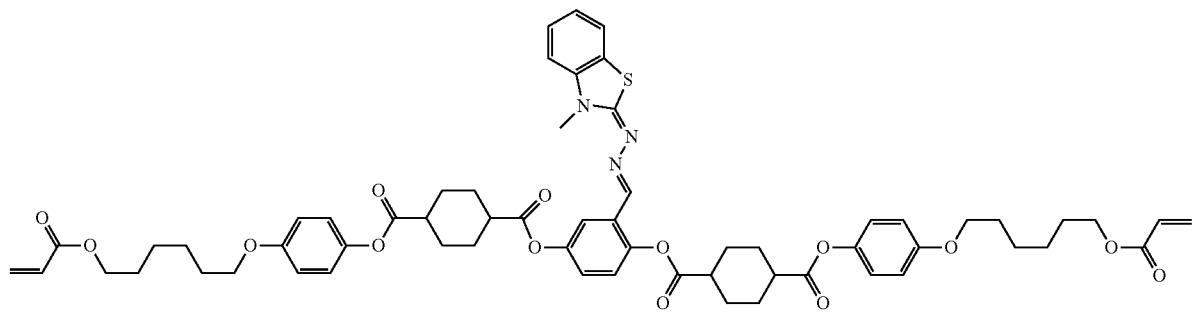

The content of the liquid crystal compound capable of showing a smectic phase is preferably 50 to 98% by mass relative to the total solids in the composition, and more preferably 50 to 95% by mass.

«Other Compound»

As other ingredient besides the liquid crystal compound capable of showing a smectic phase and the non-liquid crystal compound which satisfies the conditions A and B, the composition of this invention may further contain other polymerizable rod-like liquid crystal compound other than the liquid crystal compound capable of showing a smectic phase; non-liquid-crystalline polymerizable compound such as multifunctional acrylate compound which serves as a binder component; photo-polymerization initiator; fluorine-containing compound; solvent; and so forth.

«<Other Polymerizable Rod-Like Compound»>

The polymerizable rod-like compound may or may not have liquid crystallinity. By adding the polymerizable rod-like compound, a temperature range for the smectic phase of the composition may be controlled.

Since being handled as the composition after mixed with the polymerizable rod-like liquid crystal compound capable of showing a smectic phase, such other polymerizable rod-like compound may be any of those highly compatible with the polymerizable rod-like liquid crystal compound capable of showing a smectic phase. In particular, at least one selected from a compound represented by Formula (2) below, and, a compound represented by Formula (3) below may be used. Also a compound represented by Formula (II) described above may be used.

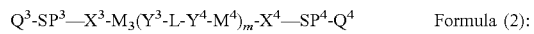  Formula (2):

In the formula, m represents an integer of 0 or more which indicates the number of repetition of $(Y^3\text{-}L\text{-}Y^4\text{-}M^4)$;

each of $Q^3$ and $Q^4$ represents a polymerizable group;

$SP^3$ and $SP^4$ represent the same group which represents a straight-chain or branched alkylene group, or a group obtained by combining it with —O— and/or —C(=O)—, and having a total number of carbon atoms of 2 to 8 in integer;

$X^3$ and $X^4$ represent the same group which represents a single bond or oxygen atom;

—$Y^3$-L-$Y^4$— represents a straight-chain alkylene group, or a group obtained by combining it with —O— and/or —C(=O)—, and having a total number of carbon atoms of 3 to 18 in integer; and $M^3$ and $M^4$ represent a group composed of two or more aromatic rings and —O— and/or —C(=O)—.

The groups composing Formula (2) may be same as those composing Formula (I).

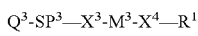 Formula (3):

In the formula, $Q^3$ represents a polymerizable group;

$SP^3$ represents a straight-chain or branched alkylene group, or a group obtained by combining it with —O— and/or —C(=O)—, and having a total number of carbon atoms of 2 to 8 in integer;

each of $X^3$ and $X^4$ independently represents a single bond or oxygen atom;

$M^3$ represents a group composed of an aromatic ring and —O— and/or —C(=O)—; and $R^1$ represents a hydrocarbon group.

The groups composing Formula (3) may be same as those composing Formula (I).

The hydrocarbon group preferably has a cyclic alkylene group, and is preferably a group composed of a combination of a cyclic alkylene group having 3 to 8 carbon atoms and an alkyl group having 1 to 5 carbon atoms.

The aromatic ring may have a substituent, where the substituent is preferably an alkoxy group having 1 to 4 carbon atoms.

When the polymerizable rod-like compound is used, the amount of consumption thereof is 1 to 50% by mass relative to the polymerizable rod-like liquid crystal compound capable of showing a smectic phase, and preferably 5 to 45% by mass.

In this invention, other preferable mode is to use two or more different types of rod-like liquid crystal compounds in order to suppress crystallization. The rod-like liquid crystal to be combined may be a monofunctional or non-polymerizable liquid crystal.

«<Polymerization Initiator>»

Fixation of the liquid crystal compound, while keeping the state of alignment, is implemented by a polymerization reaction of a polymerizable group introduced into the liquid crystal compound. For this purpose, a polymerization initiator is preferably contained in the composition of this invention. The polymerization reaction includes thermal polymerization reaction using a thermal polymerization initiator, photo-polymerization reaction using a photo-polymerization initiator, and EB curing using electron beam. Among them, the photo-polymerization reaction is preferable.

The content of the polymerization initiator is preferably 1 to 10% by mass, relative to the whole polymerizable compound which contains the liquid crystal compound capable of showing a smectic phase and the other polymerizable compound.

Examples of additives other than those described above, used when the optically-anisotropic layer is formed using the composition, include surfactant for controlling surface property or surface profile, additive for controlling tilt angle of the liquid crystal compound (alignment auxiliary), additive for lowering the alignment temperature (plasticizer), polymerizable monomer, and chemicals for imparting other functionality, all of which are used arbitrarily.

«<Fluorine-Containing Compound>»

The composition of this invention may contain a fluorine-containing compound. The fluorine-containing compound preferably contains a polymer which contains a repeating unit derived from a monomer represented by Formula 1 below (also simply referred to as "fluorine-containing polymer", hereinafter).

The polymer which contains a repeating unit derived from a monomer represented by Formula 1 is exemplified by a polymer of a repeating unit (polymerization unit) derived from the monomer (i) shown below; acrylic resin or methacrylic resin which contains a repeating unit (polymerization unit) derived from the monomer of (i) shown below and a repeating unit (polymerization unit) derived from the monomer of (ii) below; and copolymers of them with a vinyl-base monomer copolymerizable with them. As the monomer, those described in Polymer Handbook 2nd ed., J. Brandrup, Wiley Interscience (1975), Chapter 2, pages 1 to 483 are usable.

The monomers may be exemplified by compounds having one unsaturated bond capable of participating in addition polymerization, which are selectable from acrylic acid, methacrylic acid, acrylic esters, methacrylic esters, acrylamides, methacrylamides, allyl compound, vinyl ethers, vinyl esters, and the like.

(i) Fluoroaliphatic Group-Containing Monomer Represented by Formula 1 Below

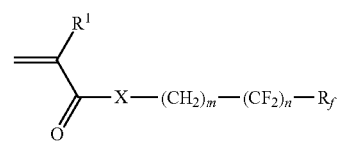

Formula 1

In Formula 1, $R^1$ represents a hydrogen atom, halogen atom or methyl group, and preferably represents a hydrogen atom or methyl group. X represents an oxygen atom, sulfur atom or —N($R^{12}$)—, more preferably represents an oxygen atom or —N($R^{12}$)—, and even more preferably an oxygen atom. $R^{12}$ represents a hydrogen atom or alkyl group having 1 to 8 carbon atoms, more preferably a hydrogen atom or alkyl group having 1 to 4 carbon atoms, and even more preferably a hydrogen atom or methyl group. $R_f$ represents —$CF_3$ or —$CF_2H$.

In formula 1, m represents an integer of 1 to 6, more preferably 1 to 3, and even more preferably 1.

In Formula 1, n represents an integer of 1 to 11, more preferably 1 to 9, and even more preferably 1 to 6. $R_f$ preferably represents —$CF_2H$.

The fluorine-containing polymer may contain, as the constituent, two or more species of polymerization unit which is derived from the fluoroaliphatic group-containing monomer represented by Formula 1.

(ii) Monomer Co-Polymerizable with (i), Represented by Formula 2 Below

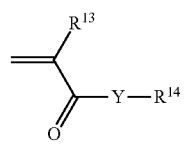

Formula 2

In Formula 2, $R^{13}$ represents a hydrogen atom, halogen atom or methyl group, and more preferably hydrogen atom or methyl group. Y represents an oxygen atom, sulfur atom or —N($R^{15}$)—, more preferably oxygen atom or —N(R$^{15}$)—, and even more preferably oxygen atom. R$^{15}$ represents a hydrogen atom or alkyl group having 1 to 8 carbon atoms, more preferably hydrogen atom or alkyl group having 1 to 4 carbon atoms, and even more preferably hydrogen atom or methyl group.

R$^{14}$ represents a straight-chain, branched or cyclic alkyl group having 1 to 60 carbon atoms, aromatic group (for example, phenyl group or naphthyl group), or a combination thereof. The alkyl group may contain poly(alkyleneoxy) group.

The fluorine-containing compound may be referred to the description, for example, in paragraphs [0033] to [0047] of JP-A-2013-254183, the contents of which are incorporated into this specification.

The content of the fluorine-containing compound is preferably 0.1 to 20% by mass relative to the total solids in the composition, and more preferably 0.1 to 2% by mass.

«<Solvent»>

The composition of this invention may contain a solvent. By containing the solvent, the composition may be improved in suitability to manufacture, typically through reduction in viscosity, when it is used for forming the optically-anisotropic layer.

Although the solvent is not specifically limited so long as the suitability to manufacture will not be adversely affected, it is preferably at least one selected from the group consisting of ketone, ester, ether, alcohol, alkane, toluene, chloroform, and methylene chloride, more preferably at least one selected from the group consisting of ketone, ester, ether, alcohol and alkane, and particularly at least one selected from the group consisting of ketone, ester, ether and alcohol.

The content of the solvent in the composition may be appropriately controlled so as to optimize the viscosity from the viewpoint of coatability, and is preferably set to 50 to 90% by mass although variable depending on the compositional ratio of ingredients of the composition.

<Method of Manufacturing Retardation Film>

The method of manufacturing a retardation film of this invention comprises coating the composition of this invention, which contains the liquid crystal compound capable of showing a smectic phase and the non-liquid crystal compound, on a support; and then fixing the liquid crystal compound in the smectic phase. For example, the retardation film of this invention may be manufactured by coating the composition over the support, and by fixing the state of alignment after treatment for the alignment control.

«Step of Coating Composition Over Support»

The support is not specifically limited. For the case where the optically-anisotropic layer is once formed and is then peeled off for use, a material capable of giving an easy-to-peel surface may be used. As this sort of temporary support used for the film making, glass plate or polyester film without easy adhesion treatment may be used.

The optically-anisotropic layer may alternatively be formed on a transparent polymer film and used in this state as a laminate. Materials preferably used for the polymer film used as the laminate include those generally used for optical materials, such as cellulose, cyclic olefin, acrylic resin, polycarbonate, polyester, and polyvinyl alcohol.

Alternatively, the optically-anisotropic layer may be formed directly on a rubbed polarizer, rather than stacked on the polymer film, to be used as a thin polarizing plate; or may be formed directly on a glass substrate such as liquid crystal cell.

On the support, an undercoat layer (adhesion layer) may be provided as described, for example, in JP-A-H07-333433. The undercoat layer is described in Journal of Technical Disclosure issued by Japan Institute of Invention and Innovation (No. 2001-1745, published on Mar. 15, 2001, JIII), p. 32, which may suitably be used. Material for forming the undercoat layer is preferably polyvinyl alcohol, modified polyvinyl alcohol or the like.

«Fixation Involving Alignment Treatment»

When the optically-anisotropic layer is formed, there is needed a technique of making the molecules of the liquid crystal compound in the composition aligned in a desired state. It is general, for example, to use an alignment film to orient the liquid crystal compound to a desired direction. The alignment film is exemplified by rubbed film made of organic compound such as polymer, film with obliquely deposited inorganic compound, micro-grooved film, and built-up film of LB films formed by the Langmuir-Blodgett method using organic compound such as w-tricosanoic acid, dioctadecylmethylammonium chloride, and methyl stearate. The alignment film is preferably formed by rubbing the surface of the polymer layer. The rubbing process is implemented by rubbing the surface of a polymer layer with paper or cloth in one direction several times. Polymers preferably used for the alignment layer include polyimide, polyvinyl alcohol, polymer having a polymerizable group described in JP-A-H09-152509, and orthogonal alignment film described in JP-A-2005-97377, JP-A-2005-99228 and JP-A-2005-128503. Now the orthogonal alignment film in the context of this invention means an alignment film capable of aligning the longitudinal axis of molecule of the polymerizable rod-like liquid crystal compound of this invention, in a direction substantially normal to the direction of rubbing of the orthogonal alignment film. The thickness of the alignment film is not always necessarily be thick, so long as it can provide an alignment function, and is preferably 0.01 to 5 µm, and more preferably 0.05 to 2 µm.

It is alternatively possible to use a so-called, photo-alignment film which may be produced by irradiating a photo-alignable material with polarized light or non-polarized light, to thereby make the alignment film. In other words, the photo-alignment film may be manufactured by coating the photo-alignable material over the support. The polarized light may be irradiated vertically or obliquely to the photo-alignment film, meanwhile the non-polarized light may be irradiated obliquely to the photo-alignment film.

The photo-alignable material preferably used in this invention for the photo-alignment film is exemplified by azo compounds described in JP-A-2006-285197, JP-A-2007-76839, JP-A-2007-138138, JP-A-2007-94071, JP-A-2007-121721, JP-A-2007-140465, JP-A-2007-156439, JP-A-2007-133184, JP-A-2009-109831, Japanese Patent No. 3883848, and Japanese Patent No. 4151746; aromatic ester compounds described in JP-A-2002-229039; maleimide- and/or alkenyl-substituted nadimide compounds having photo-alignable unit described in JP-A-2002-265541 and JP-A-2002-317013; photo-crosslinkable silane derivatives described in Japanese Patent No. 4205195 and Japanese Patent No. 4205198; photo-crosslinkable polyimides, polyamides, or esters described in JP-T2-2003-520878, JP-T2-2004-529220, and Japanese Patent No. 4162850; and photo-dimerizable compounds described in JP-A-H09-118717, JP-T2-H10-506420, JP-T2-2003-505561, WO2010/150748, JP-A-2013-177561, and JP-A-2014-12823, wherein cynnamate compounds, chalcone compound, and coumarin compound are particularly preferable. Particularly preferable examples include azo compound, photo-crosslinkable polyimide, polyamide, ester, cynnamate compound, chalcone compound.

Specific examples of particularly preferable photo-alignable material include a compound represented by Formula (X) below, described in JP-A-2006-285197.

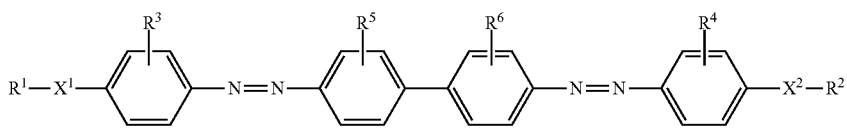

(X)

In the formula, each of $R^1$ and $R^2$ independently represents a hydroxy group, or a polymerizable group selected from the group consisting of (meth)acryloyl group, (meth)acryloyloxy group, (meth)acrylamide group, vinyl group, vinyloxy group, and maleimide group.

When $R^1$ represents a hydroxy group, $X^1$ represents a single bond, meanwhile when $R^1$ represents a polymerizable group, $X^1$ represents a linking group represented by $-(A^1-B^1)_m-$; when $R^2$ represents a hydroxy group, $X^2$ represents a single bond, meanwhile when $R^2$ or $R^8$ represents a polymerizable group, $X^2$ represents a linking group represented by $-(A^2-B^2)_n-$. Now, $A^1$ combines with $R^1$ or $R^7$, $A^2$ combined with $R^2$ or $R^8$, and, each of $B^1$ and $B^2$ independently combines with the adjacent phenylene group. Each of $A^1$ and $A^2$ independently represents a single bond, or divalent hydrocarbon group, and, each of $B^1$ and $B^2$ independently represents a single bond, —O—, —CO—O—, —O—CO—, —CO—NH—, —NH—CO—, —NH—CO—O—, or —O—CO—NH—. Each of m and n independently represents an integer of 0 to 4. When m or n is two or more, the plurality of $(A^1)$s, $(B^1)$s, $(A^2)$s and $(B^2)$s may be same or different. Note, however, that $A^1$ or $A^2$ held between two $(B^1)$s or $(B^2)$s is not a single bond. Each of $R^3$ and $R^4$ independently represents a hydrogen atom, halogen atom, carboxy group, halogenated methyl group, halogenated methoxy group, cyano group, nitro group, —$OR^7$ (where, $R^7$ represents a lower alkyl group having 1 to 6 carbon atoms, a cycloalkyl group having 3 to 6 carbon atoms, or a lower alkyl group having 1 to 6 carbon atoms substituted by a lower alkoxy group having 1 to 6 carbon atoms), hydroxyalkyl group having 1 to 4 carbon atoms, or —$CONR^8R^9$ (each of $R^8$ and $R^9$ independently represents a hydrogen atom or lower alkyl group having 1 to 6 carbon atoms), or methoxycarbonyl group. The carboxy group may form a salt with an alkali metal.

Each of $R^5$ and $R^6$ independently represents a carboxy group, sulfo group, nitro group, amino group, or hydroxy group. Each of the carboxy group and sulfo group may form a salt with an alkali metal.

«Step of Fixation in Smectic Phase»

In this invention, the liquid crystal compound capable of showing a smectic phase is fixed in the smectic phase.

The temperature range in which the liquid crystal compound shows the nematic phase, is generally higher than the temperature range in which the liquid crystal compound shows the smectic phase. Accordingly, it is preferable to induce phase transition of the liquid crystal compound from the nematic phase to the smectic phase, by once heating the liquid crystal compound to a temperature range in which the liquid crystal compound shows the nematic phase, and then lowering the temperature to a temperature range in which the liquid crystal compound shows the smectic phase. More specifically, the composition is once heated to a temperature not lower than the phase transition temperature between the nematic phase and the isotropic phase, and then controlled to a temperature 10° C. or more lower than the phase transition temperature between the nematic phase and the smectic phase.

The temperature reached when the liquid crystal compound is heated to a temperature not lower than the phase transition temperature between the nematic phase and the isotropic phase is preferably 60 to 200° C., and more preferably 100 to 140° C., although depending on species of the liquid crystal compound.

The heating time is preferably 10 seconds to 20 minutes, more preferably 10 seconds to 10 minutes, and even more preferably 10 seconds to 5 minutes.

The temperature 10° C. or more lower than the phase transition temperature between the nematic phase and the smectic phase is preferably 30 to 120° C., and more preferably 40 to 70° C., although depending on species of the liquid crystal compound.

The cooling rate preferably falls in the range from 1 to 100° C./min, and preferably in the range from 5 to 50° C./min. An excessively rapid cooling rate will result in alignment failure, meanwhile an excessively slow cooling rate will elongate the manufacturing time.

The fixation in the smectic phase may be achieved by polymerization under heating or irradiation with active energy ray, and may be implemented by properly selecting a polymerizable group or polymerization initiator suitable for the polymerization. Taking suitability to manufacture into consideration, a polymerization reaction assisted by UV irradiation is preferably used. An insufficient energy of UV will result in residence of polymerizable rod-like liquid crystal remained unpolymerized, which may result in temperature-dependent changes or time-dependent degradation of the optical characteristics.

Accordingly, it is preferable to determine the irradiation condition so as to suppress the ratio of content of residual polymerizable rod-like liquid crystal to 5% or less, wherein the irradiation condition in terms of dose is preferably 200 mJ/cm$^2$ or more in general, and more preferably 200 to 600 mJ/cm$^2$, although depending on formulation of the composition or the thickness of the optically-anisotropic layer.

<Laminate>

In this invention, the above-described retardation film of this invention may further be stacked with a separately-prepared second retardation film to provide a laminate. The second retardation film is preferably a positive C-plate which satisfies nz>nx=ny.

The positive C-plate preferably satisfies $-5 \le Re550 \le 5$, and more preferably satisfies $-3 \le Re550 \le 3$.

The positive C-plate preferably satisfies $-300 \le Rth550 \le 0$, more preferably satisfies $-200 \le Rth550 \le -60$, and even more preferably satisfies $-180 \le Rth550 \le -80$.

The positive C-plate further preferably satisfies Formulae (1) and (2) below, where Rth450, Rth550 and Rth650 are thickness-direction retardation values measured at 450 nm, 550 nm and 650 nm, respectively:

$$0.70 \le Rth(450)/Rth(550) \le 1.00 \qquad \text{Formula (1)}$$

$$0.99 \le Rth(650)/Rth(550) \le 1.30 \qquad \text{Formula (2)}$$

The second retardation film may be manufactured by direct coating over a support which is the above-described retardation film of this invention; or by coating while placing an undercoat layer such as an alignment film in between; or, by bonding it, as the optically-anisotropic layer, to an alignment layer having been preliminarily formed over some other support.

The support used here is any of those previously explained in the paragraphs regarding the method of manufacturing a retardation film.

Materials for composing the alignment film include polyvinyl alcohol and modified polyvinyl alcohol.

The optically-anisotropic layer may be formed by using the composition which contains the liquid crystal compound. The composition may also contain, as other ingredient, vertical aligning agent, polymerizable compound, polymerization initiator, or solvent.

The liquid crystal compound usable for the second retardation film may be referred to the description, for example, in paragraphs [0045] to [0066] of JP-A-2009-217256, the contents of which are incorporated into this specification. The liquid crystal compound which forms the second retardation film preferably contains at least one selected from the compound represented by Formula (31A) below, and the compound represented by the Formula (31B) below.

Formula (31A)

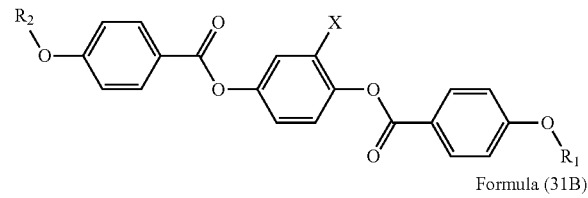

Formula (31B)

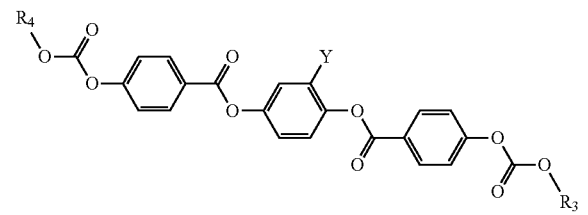

Each of $R_1$ to $R_4$ independently represents —$(CH_2)_n$—OOC—CH=$CH_2$, where n represents an integer of 2 to 5. Each of X and Y independently represents a hydrogen atom or methyl group.

From the viewpoint of suppressing crystal deposition, each of X and Y in Formula (31A) or (31B) preferably represents a methyl group.

The content of the liquid crystal compound in the composition for forming the second retardation film is preferably, but not specifically limited to, 70 to 95% by mass relative to the total solids, more preferably 80 to 95% by mass, and even more preferably 0.05 to 3% by mass. When two or more type of the liquid crystal compounds are used, the total content preferably falls within the above-described ranges.

The laminate of this invention may be manufactured by bonding the second retardation film, using a tacky agent or the like, to the retardation film of this invention.

<Polarizing Plate>

The polarizing plate of this invention has a polarizer and the retardation film of this invention.

Preferably, the retardation film resides on the surface of the polarizer, or a film of 10 μm thick or thinner resides between the polarizer and the retardation film. The polarizing plate having, on the surface of the polarizer, the retardation film may be manufactured by coating the composition of this invention over the surface of the polarizer, and then fixing the liquid crystal compound.

The polarizer is available in types of iodine-containing polarizer, dye-containing polarizer using dichroic dye, and polyene-based polarizer, and any of them may be used. The iodine-containing polarizer and the dye-containing polarizer may be manufactured generally by using a polyvinyl alcohol-based film.

In one exemplary mode of the polarizing plate, the retardation film or the laminate of this invention is stacked on one surface of the polarizer, and a protective film is stacked on the other surface. The protective film is selectable, without special limitation, from the above-described polymer films usable as the support. A preferable example of the protective film is a cellulose acylate film such as triacetyl cellulose film. The cellulose acylate film may be manufactured typically by implementing a step of preparing a dope liquid; a step of casting the dope liquid; a step of drying of the cast film; a step of stretching the dried film; and a step of surface treatment of the stretched film. The dope liquid preferably contains cellulose ester, polycondensed ester, sugar ester compound, UV absorber, fine particle, solvent or the like. The cellulose acylate film may be referred to the description, for example, in paragraphs [0018] to [0120] of JP-A-2013-235232, the contents of which are incorporated into this specification.

The film of 10 μm thick or thinner, which may be provided between the retardation film and the polarizer, is exemplified by hard coat layer or alignment film. The hard coat layer is obtained by curing a curable composition which contains a curable compound, polymerization initiator, solvent and so forth. The curable compound is a compound curable with light or heat, and is specifically exemplified by those having a curable functional group such as vinyl group, allyl group, (meth)acryloyl group, glycidyl group, or epoxy group. The polymerization initiator and the solvent usable here may be those described previously in this specification.

<Liquid Crystal Display Device>

The liquid crystal display device of this invention has the above-described retardation film, the laminate or the polarizing plate of this invention.

The liquid crystal display device generally has a liquid crystal cell and two polarizing plates disposed on both sides thereof, and the liquid crystal cell holds a liquid crystal between two electrode substrates. In some configuration, a single optically-anisotropic layer may be disposed between the liquid crystal cell and one of the polarizing plates, or two optically-anisotropic layers are disposed respectively between the liquid crystal cell and each of the polarizing plates.

The liquid crystal cell preferably operates in the TN (Twisted Nematic) mode, VA (Vertical Alignment) mode, OCB (Optical Compensated Bend) mode, IPS (In-Plane Switching) mode or ECB (Electrically Controlled Birefringence) mode, wherein the IPS mode is more preferable. The IPS mode making use of photo-alignment is particularly preferable.

EXAMPLE

Features of this invention will further be detailed referring to Examples and Comparative Examples. Materials, amounts of consumption, ratios, details of processes, and procedures of processes described in Examples below may be modified suitably, without departing from the spirit of this invention. The scope of this invention is therefore by no means interpreted limitatively by Examples described below.

Comparative Example 1

<Manufacture of Support>

A cellulose acylate film (Re: 1 nm, Rth: −6 nm, haze: 0.2%) of 60 μm thick was manufactured according to a method of manufacturing cellulose acylate film F-2 described in Example 1 of JP-A-2009-098674.

<Saponification of Support>

The support was allowed to pass over an induction heating roll at 60° C. to thereby elevate the temperature of the film surface to 40° C., over one surface of which 14 ml/m² of an alkali solution having the composition below was coated using a bar coater, heated to 110° C., and conveyed under a steam far infrared heater from Noritake Co., Ltd. for 10 seconds. Next, 3 ml/m² of pure water was coated thereon using a bar coater. Next, rinsing with water using a fountain coater and dewatering using an air-knife were repeated three times, and the support was conveyed in a drying zone at 70° C. for 10 seconds for drying, to thereby obtain an alkali-saponified, acetyl cellulose transparent support.

| Composition of Alkali Solution | (parts by mass) |
|---|---|
| Potassium hydroxide | 4.7 parts by mass |
| Water | 15.8 parts by mass |
| Isopropanol | 63.7 parts by mass |
| Surfactant | |
| SF-1: $C_{14}H_{29}O(CH_2CH_2O)_{20}H$ | 1.0 part by mass |
| Propylene glycol | 14.8 parts by mass |

<Formation of Undercoat Layer>

Over the thus-saponified acetyl cellulose transparent support, a modified polyvinyl alcohol solution having the composition below was continuously coated using a #14 wire bar. The support was dried under a hot air at 100° C. for 120 seconds, to thereby form an undercoat layer.

| Composition of Modified Polyvinyl Alcohol Solution | |
|---|---|
| Modified polyvinyl alcohol, below | 2.4 parts by mass |
| Isopropanol | 1.6 parts by mass |
| Methanol | 36 parts by mass |
| Water | 60 parts by mass |

Modified polyvinyl alcohol

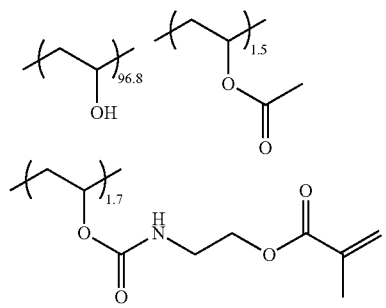

<Manufacture of Photo-Alignment Film>

Over the thus-formed undercoat layer, a coating liquid for forming the photo-alignment film having the composition below was coated using a #2 wire bar. The support was heated under a hot air at 60° C. for 60 seconds, to thereby form a photo-alignment film. The photo-alignment film was vertically irradiated, in the air, with UV using a 750 mW/cm² ultra-high pressure mercury lamp (UL750, from Hoya Candeo Optronics Corporation). In the exposure, a wire-grid polarizer (Proflux PPL02, from Moxtek, Inc.) was set in parallel to the plane of the photo-alignment film. The irradiance of UV used here in the UV-A region (cumulative over the range from 380 nm to 320 nm) was set to 5 mW/cm², and the dose in the UV-A region was set to 50 mJ/cm².

| Composition of Coating Liquid for Forming Photo-Alignment Film | |
|---|---|
| Material for photo-alignment, below | 1 part by mass |
| Water | 16 parts by mass |
| Butoxyethanol | 42 parts by mass |
| Propylene Glycol Monomethyl Ether | 42 parts by mass |

Material for Photo-Alignment:

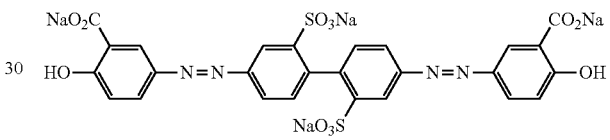

<Formation of Optically-Anisotropic Layer>

Next, coating liquid "A" for forming an optically-anisotropic layer, below was prepared. The coating liquid was coated over the surface of a slide glass, and observed under heating, under a polarization microscope. The phase transition temperature (TNI) between the isotropic phase and the nematic phase was found to be 133° C., and the phase transition temperature (TSmN) between the smectic-A phase and the nematic phase was found to be 75° C.

| Composition of Coating Liquid "A" for Forming Optically-Anisotropic Layer | |
|---|---|
| Smectic liquid crystal compound Sm-1 | 57.5 parts by mass |
| Rod-like compound RL-1 | 30 parts by mass |
| Rod-like compound RL-2 | 12.5 parts by mass |
| Photo-polymerization initiator P-1 | 6.0 parts by mass |
| Fluorine-containing compound F-1 | 0.2 parts by mass |
| Cyclopentanone | 227.1 parts by mass |

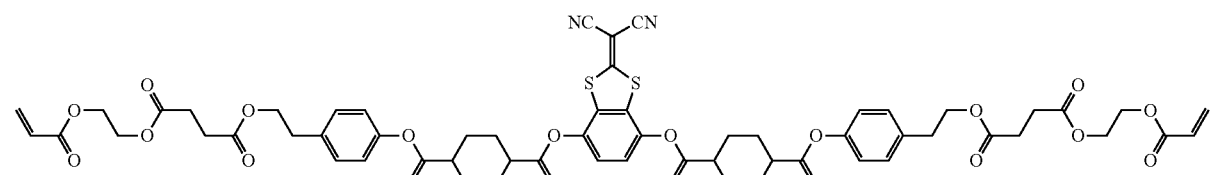

Smectic liquid crystal compound Sm-1

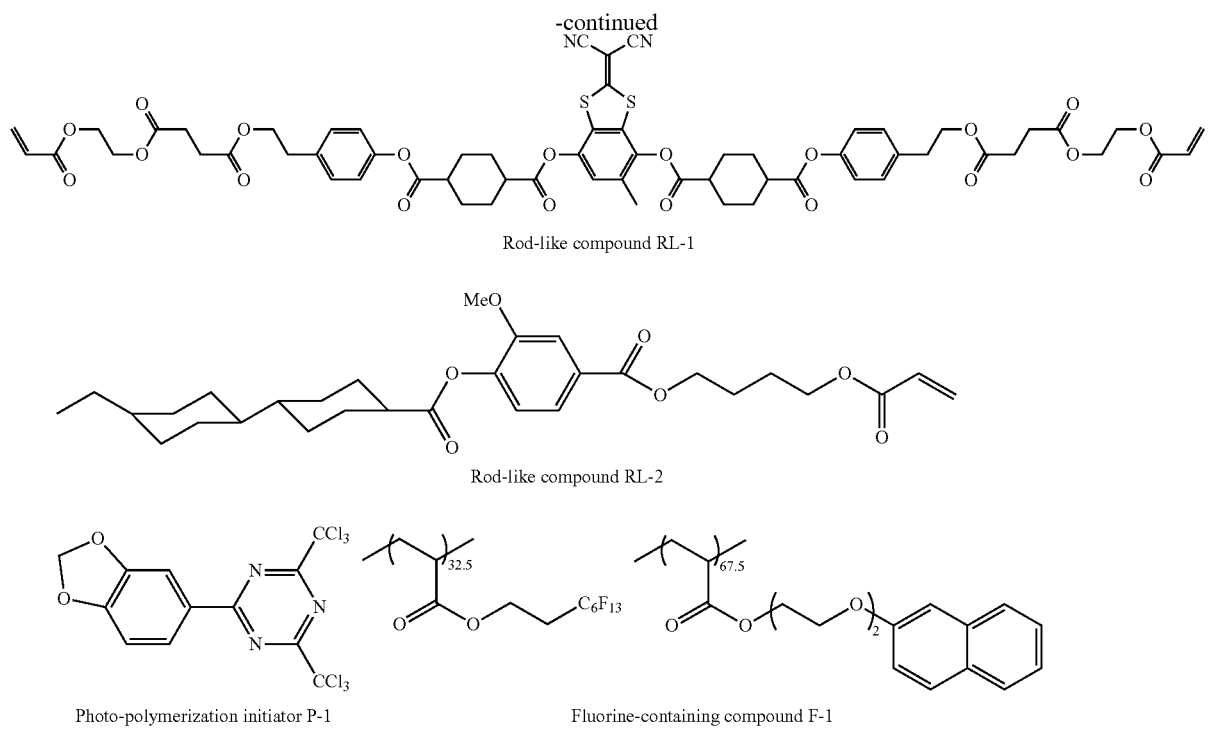

Rod-like compound RL-1

Rod-like compound RL-2

Photo-polymerization initiator P-1

Fluorine-containing compound F-1

Over the photo-alignment film formed on the support, the coating liquid "A" for forming optically-anisotropic layer was coated using a #5 bar coater. Next, the product was ripened by heating at a film surface temperature of 140° C. for 10 seconds, cooled down to 50° C., irradiated with a 500 mJ/cm² UV using an air-cooled metal halide lamp (from Eye Graphics Co., Ltd.) under a nitrogen atmosphere so as to fix the state of alignment, to thereby form an optically-anisotropic layer. The thus formed optically-anisotropic layer was found to have the slow axis in the direction perpendicular to the transmission axis of the wire-grid polarizer used for irradiating polarized light onto the photo-alignment film. The optically-anisotropic layer was found to be 2.4 μm thick. Measurement of incident angle dependence of Re and tilt angle of optic axis using an automatic birefringence analyzer (KOBRA-21ADH, from Oji Scientific Instruments) revealed that, at 550 nm, Re was 144 nm, Rth was 71 nm, and Re(450)/Re(550) was 0.87.

Example 1

An optically-anisotropic layer was formed in the same way as in Comparative Example 1, except that the coating liquid "A" for forming an optically-anisotropic layer was replaced with a coating liquid "B" for forming an optically-anisotropic layer below. Measurement of incident angle dependence of Re and tilt angle of optic axis using an automatic birefringence analyzer (KOBRA-21ADH, from Oji Scientific Instruments) revealed that, at 550 nm, Re was 142 nm, and Rth was 70 nm.

| Composition of Coating Liquid "B" for Forming Optically-Anisotropic Layer | |
|---|---|
| Smectic liquid crystal compound Sm-1 | 57.5 parts by mass |
| Rod-like compound RL-1 | 30 parts by mass |
| Rod-like compound RL-2 | 12.5 parts by mass |
| Photo-polymerization initiator P-1 | 6.0 parts by mass |
| Fluorine-containing compound F-1 | 0.2 parts by mass |
| Additive A-1 | 6.0 parts by mass |
| Cyclopentane | 227.1 parts by mass |

Additive A-1 (2-Methyl-2-adamantyl acrylate; from IS Chemical Technology Ltd.)

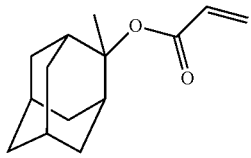

Molecular weight: 220

Example 2

An optically-anisotropic layer was formed in the same way as in Example 1, except that additive A-1 was replaced by additive A-2 below. Measurement of incident angle dependence of Re and tilt angle of optic axis using an automatic birefringence analyzer (KOBRA-21ADH, from Oji Scientific Instruments) revealed that, at 550 nm, Re was 142 nm, and Rth was 70 nm.

Additive A-2 (2-Ethyl-2-adamantyl acrylate)

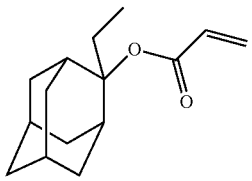

Molecular weight: 234

Example 3

An optically-anisotropic layer was formed in the same way as in Example 1, except that additive A-1 was replaced by additive A-3 below, and the fixation temperature was changed to 42° C. Measurement of incident angle dependence of Re and tilt angle of optic axis using an automatic birefringence analyzer (KOBRA-21ADH, from Oji Scientific Instruments) revealed that, at 550 nm, Re was 145 nm, and Rth was 71 nm.

Additive A-3 (4-Adamantyl toluene)

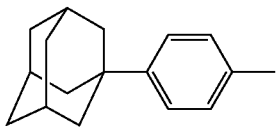

Molecular weight: 226

Comparative Example 2

An optically-anisotropic layer was formed in the same way as in Example 1, except that additive A-1 was replaced by additive A-4 below. Measurement of incident angle dependence of Re and tilt angle of optic axis using an automatic birefringence analyzer (KOBRA-21ADH, from Oji Scientific Instruments) revealed that, at 550 nm, Re was 140 nm, and Rth was 69 nm.

Additive A-4 (A-DCP, from Shin-Nakamura Chemical Co., Ltd.)

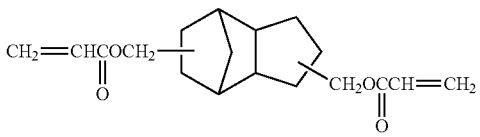

Molecular weight: 304

[Evaluation of Streak Defect]

Figure 2:
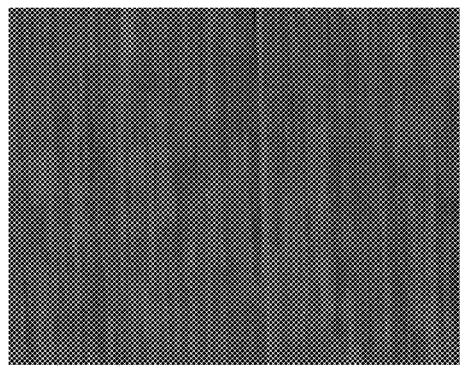
FIG. 2 is a drawing illustrating a streak defect observed in a polarized microphotograph.
Figure 3:
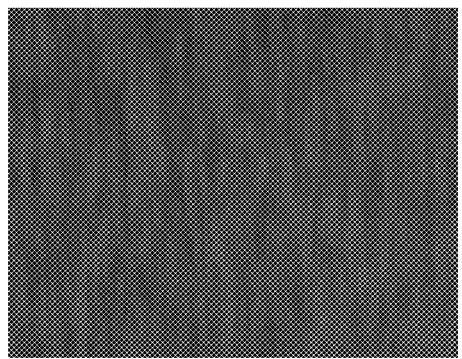
FIG. 3 is a drawing illustrating a streak defect observed in a polarized microphotograph.
Figure 4:
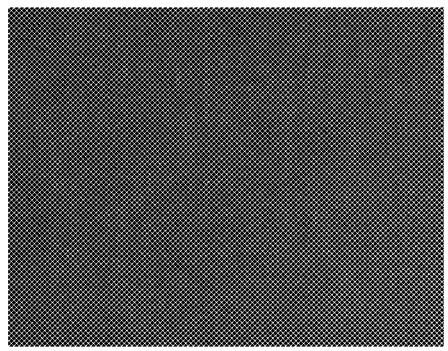
FIG. 4 is a drawing illustrating a streak defect observed in a polarized microphotograph.

The optically-anisotropic layer was placed in the direction of extinction under a polarization microscope, and observed while shifting the upper and lower polarizing plates in the same direction at 2° intervals, and streak defect was evaluated according to a four-grade evaluation scale with the grades below:

1 point: state shown in FIG. 1
2 points: state shown in FIG. 2
3 points: state shown in FIG. 3
4 points: state shown in FIG. 4

[Evaluation by Liquid Crystal Display Device]

<Formation of Alignment Film for Positive C-Plate>

Over the above-described acetyl cellulose transparent support, a coating liquid for forming alignment film C having the composition below was continuously coated using a #8 wire bar. The product was dried under a hot air at 60° C. for 60 seconds, and further under a hot air at 100° C. for 120 seconds, to thereby form alignment film C.

| Composition of Coating Liquid for Forming Alignment Film C | |
|---|---|
| Polyvinyl alcohol PVA103 (from Kuraray Co., Ltd.) | 2.4 parts by mass |
| Isopropanol | 1.6 parts by mass |
| Methanol | 36 parts by mass |
| Water | 60 parts by mass |

<Manufacture of Positive C-Plate>

Over the Alignment film C, coating liquid K below was coated, ripened at 60° C. for 60 seconds, irradiated under air with 1000 mJ/cm² of UV using a 70 mW/cm² air-cooled metal halide lamp (from Eye Graphics Co., Ltd.) so as to vertically align the polymerizable rod-like liquid crystal compound and to fix the state of alignment, to thereby form a positive C-plate. The Rth at 550 nm was found to be −97 nm.

| Composition of Coating Liquid K for Forming Optically-Anisotropic Layer | |
|---|---|
| Liquid crystal compound B01 | 80 parts by mass |
| Liquid crystal compound B02 | 20 parts by mass |
| Vertical alignment agent (S01) | 1 part by mass |
| Vertical alignment agent (S02) | 0.5 parts by mass |
| Ethylene oxide-modified trimethylolpropane triacrylate (V#360, from Osaka Organic Chemical Industry Ltd.) | 8 parts by mass |
| Irgacure (registered trademark) 907 (from BASF) | 3 parts by mass |
| Kayacure (registered trademark) DETX (from Nippon Kayaku Co., Ltd.) | 1 part by mass |
| B03 | 0.4 parts by mass |
| Methyl ethyl ketone | 220 parts by mass |
| Cyclohexane | 39 parts by mass |

B01

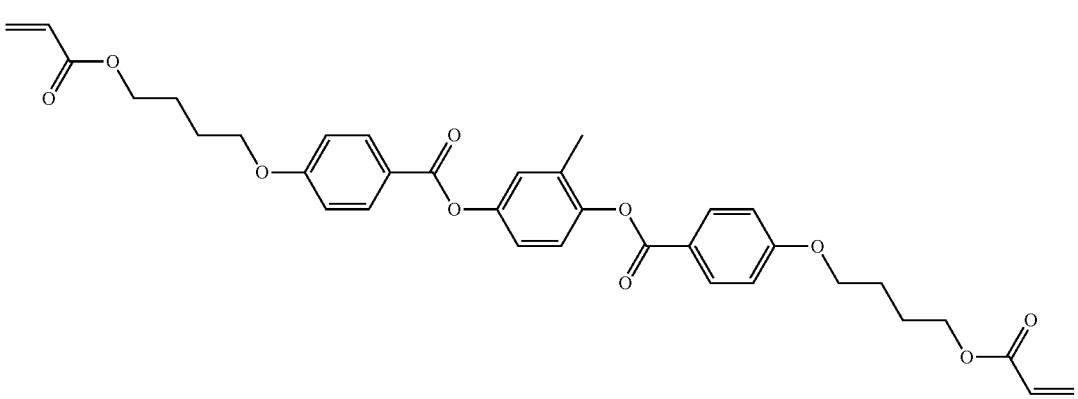

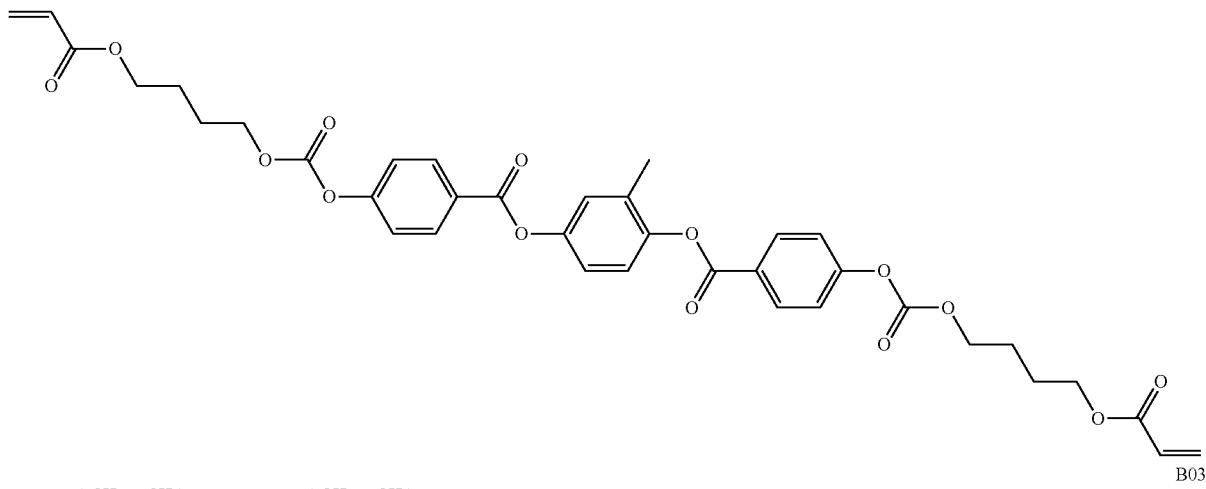

B02

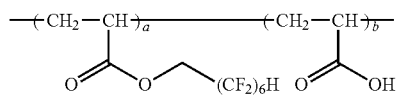

B03

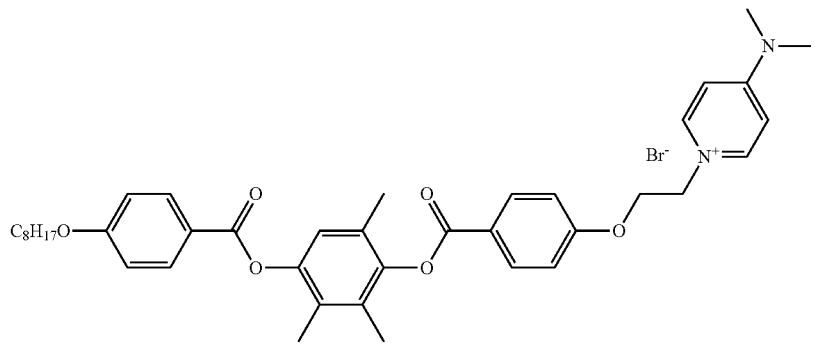

S01

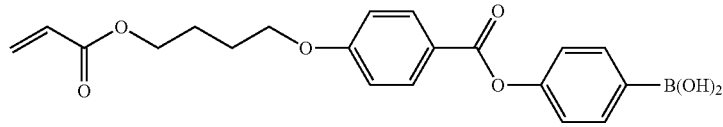

S02

45

<Lamination of Optically-Anisotropic Layer and Positive C-Plate>

Over the coated surface of the optically-anisotropic layer manufactured in Comparative Example 1, the coated surface of the positive C-plate was laminated using a tacky agent. After the lamination, the temporary support for formation was peeled off, to thereby manufacture a laminate.

<Manufacture of Polarizing Plate>

The surface of a support TD80UL (from FUJIFILM Corporation) was alkali-saponified. The support was immersed in a 1.5 N aqueous sodium hydroxide solution at 55° C. for 2 minutes, rinsed in a water rinsing bath at room temperature, and then neutralized with a 0.1 N sulfuric acid at 30° C. The support was again rinsed in a water rinsing bath at room temperature, and then dried under a hot air at 100° C.

Next, a rolled polyvinyl alcohol film of 80 µm thick was continuously stretched 5-fold in an aqueous iodine solution, and then dried to obtain a polarizer of 20 µm thick.

On the other surface, the surface of the above-prepared laminate opposite to the coated surface was bonded, to thereby obtain a polarizing plate having the polarizer held between TD80UL (from FUJIFILM Corporation) and the laminated optical film which serve as the protective films of the polarizer. Aqueous solution of a polyvinyl alcohol-base adhesive was used for the bonding. In the bonding, the slow axis of the optically-anisotropic layer and the absorption axis of the polarizer were arranged normal to each other.

<Manufacture of Liquid Crystal Display Device>

From a liquid crystal cell of iPad (registered trademark, from Apple Inc.), a polarizing plate on the viewer's side was peeled off, and the residue was used as an IPS-mode liquid crystal cell.

In place of the peeled-off polarizing plate, the polarizing plate bonded with the laminated optically-anisotropic layer manufactured above was bonded to the liquid crystal cell, to thereby manufacture a liquid crystal display device. In the bonding, the absorption axis of the polarizing plate and the optic axis of the liquid crystal layer in the liquid crystal cell were arranged normal to each other, when observed in the direction perpendicular to the substrate plane of the liquid crystal cell.

<Evaluation>

Display performance was evaluated using a commercially available viewing angle spectral analyzer EZContrast (from ELDIM), and also using, as a back light, iPad (registered trademark, from Apple Inc.), which is a commercially available liquid crystal display device. In the measurement, the liquid crystal cell laminated with the polarizing plate was disposed so as to direct the optically-anisotropic layer opposite to the back light.

(Front Contrast)

The panel was measured regarding luminance (Yw) in the white display in the vertical view, and luminance (Yb) in the black display in the vertical view, contrast ratio (Yw/Yb) in the direction vertical to the panel was calculated, and this was evaluated as the front contrast according to the criteria below:

A: front contrast is 95% or larger, as compared with the original panel before being re-bonded with the polarizing plate on the viewer's side;

Smectic liquid crystal compound Sm-2

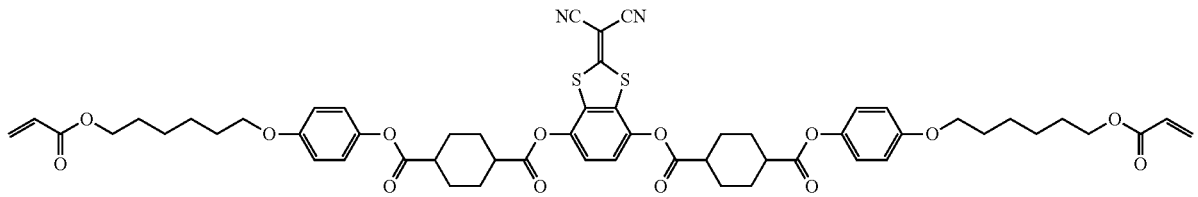

B: front contrast is 85% or larger and smaller than 95%, as compared with the original panel before being re-bonded with the polarizing plate on the viewer's side;

C: front contrast is 75% or larger and smaller than 85%, as compared with the original panel before being re-bonded with the polarizing plate on the viewer's side; and D: front contrast is smaller than 75%, as compared with the original panel before being re-bonded with the polarizing plate on the viewer's side.

Results of evaluation of the optically-anisotropic layers manufactured in Examples 1 to 3, and Comparative Examples 1, 2 are summarized in Table below.

It is understood from Table below that the streak defect was improved when decrease in TNI was 30° C. or less, and the effect was prominent when decrease in TNI was 10° C. or less.

It is understood from Comparative Examples 1, 2, and Examples 1, 2 that correlation is found between the results of evaluation of the streak defect and the front contrast, proving that degradation in contrast of the panel is ascribable to the streak defect. Example 3 was good in terms of streak defect, but the front contrast could not be measured since crystallization occurred in the optically-anisotropic layer.

Example 4

An optically-anisotropic layer was manufactured in the same way as in Comparative Example 1, except that coating liquid A for forming an optically-anisotropic layer was replaced with coating liquid "C" for forming an optically-anisotropic layer below, the ripening temperature was set to 170° C., and the fixation temperature was set to 120° C. Measurement of incident angle dependence of Re and tilt angle of optic axis using an automatic birefringence analyzer (KOBRA-21ADH, from Oji Scientific Instruments) revealed that, at 550 nm, Re was 102 nm, and Rth was 50 nm.

Composition of Coating Liquid "C" for Forming Optically-Anisotropic Layer

| | |
|---|---|
| Smectic liquid crystal compound Sm-2 | 87.5 parts by mass |
| Rod-like compound RL-2 | 12.5 parts by mass |
| Photo-polymerization initiator P-1 | 6.0 parts by mass |
| Fluorine-containing compound F-1 | 0.2 parts by mass |
| Additive A-3 | 6.0 parts by mass |
| Chloroform | 227.1 parts by mass |

Comparative Example 3

An optically-anisotropic layer was manufactured in the same way as in Example 4, except that the amount of consumption of additive A-3 was set to zero parts by mass. Measurement of incident angle dependence of Re and tilt angle of optic axis using an automatic birefringence analyzer (KOBRA-21ADH, from Oji Scientific Instruments) revealed that, at 550 nm, Re was 105 nm, and Rth was 51 nm.

It is understood from comparison between Comparative Example 3 and Example 4 that the streak defect was improved by using additive A-3. Comparison between Example 3 and Example 4 also teaches that crystal did not appear when the fixation temperature was set higher than the melting point of the additive.

Example 5

An optically-anisotropic layer was manufactured in the same way as in Comparative Example 1, except that coating liquid A for forming an optically-anisotropic layer was replaced with coating liquid "D" for forming optically-anisotropic layer below, the ripening temperature was set to 120° C., and the fixation temperature was set to 40° C. Measurement of incident angle dependence of Re and tilt angle of optic axis using an automatic birefringence analyzer (KOBRA-21ADH, from Oji Scientific Instruments) revealed that, at 550 nm, Re was 130 nm, and Rth was 64 nm.

| Composition of Coating Liquid "D" for Forming Optically-Anisotropic Layer | |
|---|---|
| Smectic liquid crystal compound Sm-3 | 57.5 parts by mass |
| Rod-like compound RL-3 | 30 parts by mass |
| Rod-like compound RL-2 | 12.5 parts by mass |
| Photo-polymerization initiator P-1 | 6.0 parts by mass |
| Fluorine-containing compound F-1 | 0.2 parts by mass |
| Addition A-1 | 6.0 parts by mass |
| Chloroform | 227.1 parts by mass |

Smectic liquid crystal compound Sm-3

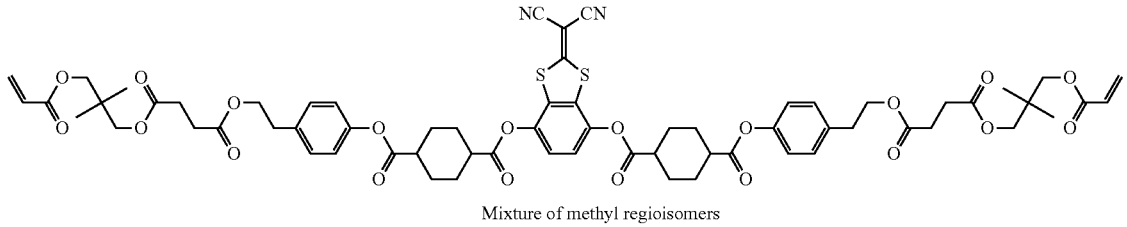

Mixture of methyl regioisomers

Rod-like compound RL-3

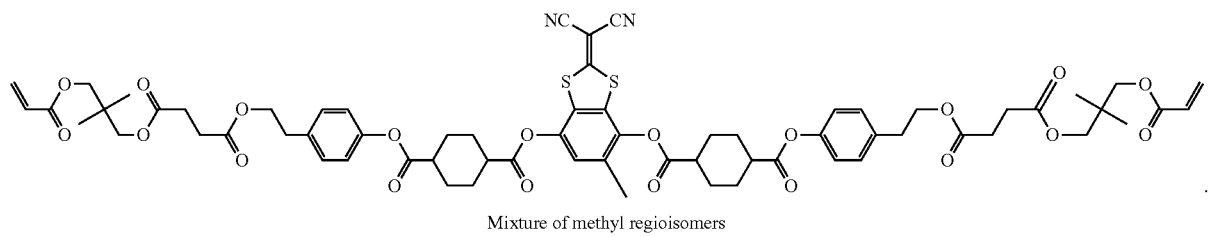

Mixture of methyl regioisomers

Comparative Example 4

An optically-anisotropic layer was manufactured in the same way as in Example 5, except that the amount of consumption of additive A-1 was set to zero parts by mass.

Example 6, Example 7

Optically-anisotropic layers were manufactured in the same way as in Example 1, except that the ripening temperature and the fixation temperature were set as summarized in Table below. Measurement of incident angle dependence of Re and tilt angle of optic axis using an automatic birefringence analyzer (KOBRA-21ADH, from Oji Scientific Instruments) revealed that Example 6 showed an Re of 142 nm and an Rth of 70 nm at 550 nm, and Example 7 showed an Re of 138 nm and an Rth of 68 nm at 550 nm.

It was understood from comparison between Example 6 and Example 1 that the streak defect was improved by setting the ripening temperature not lower than TNI. It was understood from comparison between Example 7 and Example 1 that the streak defect was improved by setting the fixation temperature 10° C. or more lower than TSmN.

Example 11 to Example 14

An optically-anisotropic layers were formed in the same way as in Example 1, except that additive A-1 was replaced by additive A-5 (Example 11), additive A-6 (Example 12), additive A-7 (Example 13), or additive A-8 (Example 14). The optically-anisotropic layers were evaluated in the same way as in Example 1. The results are shown in Table below.

additive A-5: Bis[2-(2-methoxyethoxy)ethyl]ether:

$CH_3O-CH_2-CH_2-O-CH_2-CH_2-O-CH_2-CH_2-O-CH_2-CH_2-OCH_3$

Molecular weight: 222 additive A-6: Bis(2-butoxyethyl)ether:

$CH_3(CH_2)_3-O-CH_2-CH_2-O-CH_2-CH_2-O-(CH_2)_3CH_3$

Molecular weight: 218 additive A-7: APG-200 (from Shin-Nakamura Chemical Co., Ltd.):

$CH_2=CHCOO-(CH(CH_3)CH_2O)_m-(CH_2CH(CH_3)O)_nOCCH=CH_2 (m+n=3)$

Molecular weight: 300 additive A-8: A-200 (from Shin-Nakamura Chemical Co., Ltd.):

$CH_2=CH-CO-O(CH_2-CH_2O)_nOC-CH=CH_2 (n=4)$

Molecular weight: 308

Comparative Example 11 to Comparative Example 13

An optically-anisotropic layers were formed in the same way as in Example 1, except that additive A-1 was replaced by additive A-9 (Comparative Example 11), additive A-10 (Comparative Example 12), or additive A-11 (Comparative Example 13). The optically-anisotropic layers were evaluated in the same way as in Example 1. The results are shown in Table below.

additive A-9: SP327 (from Osaka Organic Chemical Industry Ltd.)

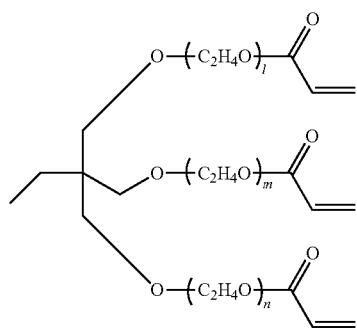

l + m + n = 3 additive A-10: DCP (from Shin-Nakamura Chemical Co., Ltd.)

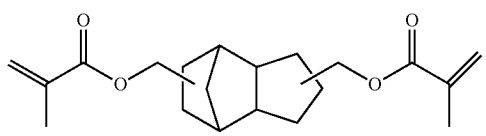

additive A-11: tert-butanol
C(CH$_3$)$_3$OH

Example 8

<Manufacture of Polarizing Plate Protective Film>

(Preparation of Cellulose Ester Solution for Forming Air-Side Layer)

The composition below was placed in a mixing tank, and stirred under heating to dissolve the individual ingredients, to thereby prepare a cellulose ester solution for forming an air-side layer.

| Composition of Cellulose Ester Solution for Forming Air-Side Layer | |
|---|---|
| Cellulose ester (degree of acetyl substitution = 2.86) | 100 parts by mass |
| Sugar ester compound represented by Formula (R-I) | 3 parts by mass |
| Sugar ester compound represented by Formula (R-II) | 1 part by mass |
| UV absorber, shown below | 2.4 parts by weight |
| Silica particle dispersion liquid (Aerosi (registered trademark) R972, average particle size = 16 nm, from Nippon Aerosil Co., Ltd.) | 0.026 parts by mass |
| Methylene chloride | 339 parts by mass |
| Methanol | 74 parts by mass |
| Butanol | 3 parts by mass |

Formula (R-I)

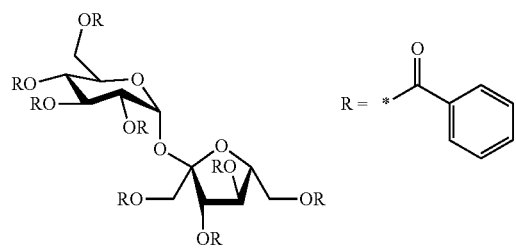

Composition of Cellulose Ester Solution for Forming Air-Side Layer

Formula (R-II)

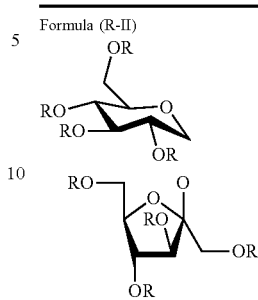

R = Acetate/i-Butylate (2/8)
UV absorber:

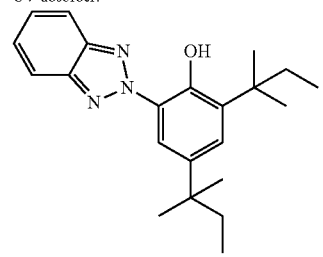

(Preparation of Cellulose Ester Solution for Forming Drum-Side Layer)

The composition below was placed in a mixing tank, and stirred under heating to dissolve the individual ingredients, to thereby prepare a cellulose ester solution for forming a drum-side layer.

| Composition of Cellulose Ester Solution for Forming Drum-Side layer | |
|---|---|
| Cellulose ester (degree of acetyl substitution = 2.86) | 100 parts by mass |
| Sugar ester compound represented by Formula (R-I) | 3 parts by mass |
| Sugar ester compound represented by Formula (R-II) | 1 part by mass |
| UV absorber | 2.4 parts by mass |
| Silica particle dispersion liquid (Aerosil R972, average particle size: 16 nm, from Nippon Aerosil Co., Ltd.) | 0.091 parts by mass |
| Methylene chloride | 339 parts by mass |
| Methanol | 74 parts by mass |
| Butanol | 3 parts by mass |

(Preparation of Cellulose Ester Solution for Forming Core Layer)

The composition below was placed in a mixing tank, and stirred under heating to dissolve the individual ingredients, to thereby prepare a cellulose ester solution for forming a core layer.

| Composition of Cellulose Ester Solution for Forming Core Layer | |
|---|---|
| Cellulose ester (degree of acetyl substitution = 2.86) | 100 parts by mass |
| Sugar ester compound represented by Formula (R-I) | 8.3 parts by mass |
| Sugar ester compound represented by Formula (R-II) | 2.8 parts by mass |
| UV absorber, shown above | 2.4 parts by mass |
| Methylene chloride | 266 parts by mass |

-continued

| Composition of Cellulose Ester Solution for Forming Core Layer | |
| --- | --- |
| Methanol | 58 parts by mass |
| Butanol | 2.6 parts by mass |

(Film Making by Co-Casting)

An apparatus was configured to enable casting of three-layered film, by providing a feed block customized for co-casting, as a casting die. The cellulose ester solution for forming the air-side layer, the cellulose ester solution for forming the core layer, and, the cellulose ester solution for forming the drum-side layer were co-cast from a discharge port onto a drum cooled at −7° C. Flow rates of the individual dopes were controlled so that the ratio of thickness of air-side layer/core layer/drum-side layer will be 7/90/3.

The dopes were cast on a stainless steel support with a mirror finished surface, in the form of a 3-m-diameter drum. A dry air at 34° C. was blown against the drum at a flow rate of 270 m³/min.

The cellulose ester film having been cast and fed by rotation was peeled off from the drum at a position 50 cm ahead of the end point of the casting portion, and the film was then clipped at both edges using a pin tenter. When peeled off, the film was stretched by 5% in the feed direction (longitudinal direction).

The cellulose ester web held by the tenter was then conveyed to a drying zone. The drying was initially effected by blowing a dry air at 45° C., and then effected at 110° C. for 5 minutes. In this process, the cellulose ester was conveyed so as to be stretched by 10% in the widthwise direction.

After released from the pin tenter, the web was continuously slit in the portions which had been held by the pin tenter, and then knurled over a width of 15 mm at both edges to form an irregularity of 10 μm high. The width of the web at this point of time was 1610 mm. The web was then dried at 140° C. for 10 minutes under a tensile stress load of 210 N in the feed direction. The web was continuously slit at the edges so as to give a desired width. A cellulose ester film of 41 μm thick was thus manufactured.

(Formation of Hard Coat Layer)

The curable composition below was prepared as a coating liquid for forming a hard coat layer.

| (Curable Resin Composition) | |
| --- | --- |
| Kayarad DPHA (from Nippon Kayaku Co., Ltd.) | 48.5 parts by mass |
| Kayarad PET30 (from Nippon Kayaku Co., Ltd.) | 48.5 parts by mass |
| Irgacure 127: polymerization initiator (from BASF) | 3.0 parts by mass |
| Toluene | 97.0 parts by mass |
| Cyclohexanone | 3.0 parts by mass |

Over the cellulose ester film manufactured above, the curable resin composition was coated according to a die coating method using a slot die described in Example 1 of JP-A-2006-122889, at a conveying speed of 30 m/min, and then dried at 60° C. for 60 seconds. The coated layer was then irradiated with UV at an irradiance of 400 mJ/cm² and a dose of 390 mJ/cm², using a 160 W/cm² air-cooled metal halide lamp (from Eye Graphics Co., Ltd.) under a nitrogen-purged atmosphere (oxygen concentration of approx. 0.1%) so as to cure the coated layer, and the product was then rewound. The amount of coating was controlled so as to make the cured layer 4 μm thick. In this way, a polarizing plate protective film with a hard coat layer (also referred to as "polarizing plate protective film", hereinafter) having a total thickness of 45 μm was manufactured.

<Manufacture of Single-Sided Polarizing Plate>

The polarizing plate protective film was prepared, immersed in a 1.5 mol/L aqueous NaOH solution (saponifying solution) kept at 55° C. for 2 minutes, and then rinsed with water. The film was then immersed in a 0.05 mol/L aqueous sulfuric acid solution at 25° C. for 30 seconds, and kept in a rinsing bath with running water for 30 seconds, to thereby neutralize the film. The film was then repetitively dewatered three times using an air knife, and after dewatered, the film was allowed to stay in a drying zone at 70° C. for 15 seconds, to thereby obtain a saponified film.

The saponified polarizing plate protective film was bonded to one surface of the polarizer (polarizer which contains a polyvinyl alcohol-base resin) of 20 μm thick, using a polyvinyl alcohol-base adhesive, and dried at 70° C. for 10 minutes or longer, to thereby manufacture polarizing plate A. The transmission axis of the polarizer and the feed direction of the film were arranged normal to each other. In the bonding, the film side of the polarizing plate protective film was faced to the polarizer.

<Manufacture of Photo-Alignment Film on Single-Sided Polarizing Plate>

Over the polarizer of the single-sided polarizing plate manufactured above, the coating liquid for forming a photo-alignment film described in [Comparative Example 1] was directly coated to thereby form a photo-alignment film, and then exposed to linear polarized light through a wire grid polarizer.

<Manufacture of Optically-Anisotropic Layer>

Over the photo-alignment film of the single-sided polarizing plate manufactured above, the coating liquid B for forming an optically-anisotropic layer was coated using a #5 bar coater. The coated film was then ripened at a surface temperature or 80° C. for 300 seconds, then cooled to 50° C., and irradiated with UV at a dose of 500 mJ/cm² using an air-cooled metal halide lamp (from Eye Graphics Co., Ltd.) under a nitrogen atmosphere so as to fix the state of alignment, to thereby form an optically-anisotropic layer.

Comparative Example 5

An optically-anisotropic layer was manufactured in the same way as in Example 8, except that coating liquid B for forming an optically-anisotropic layer was replaced with coating liquid A for forming an optically-anisotropic layer.

Example 9

<Manufacture of Photo-Alignment Film by Direct Coating over Single-Sided Polarizing Plate>

The surface of the single-sided polarizing plate manufactured in Example 8 was continuously rubbed in the longitudinal direction of the polarizer, that is, the direction of the absorption axis of the polarizer. Over the rubbed surface, coating liquid B for forming an optically-anisotropic layer was coated using a #5 bar coater. The coated film was then ripened at a surface temperature or 80° C. for 300 seconds, then cooled to 50° C., and irradiated with UV at a dose of 500 mJ/cm² using an air-cooled metal halide lamp (from Eye Graphics Co., Ltd.) under a nitrogen atmosphere so as to fix the state of alignment, to thereby form an optically-anisotropic layer. The thus formed optically-anisotropic layer was found to have the slow axis aligned in parallel to the longitudinal direction of the polarizer.

Comparative Example 6

An optically-anisotropic layer was manufactured in the same way as in Example 9, except that coating liquid B for forming an optically-anisotropic layer was replaced with coating liquid A for forming an optically-anisotropic layer.

It was confirmed that, also on the single-sided polarizing plate, the streak defect was improved by additive A-1, in the same way as on the saponified TAC film with the undercoat.

TABLE 3

| | Liquid crystal composition | Additive | Melting point of additive | Boiling point of additive | TNI | Lowering of TNI due to additive | TSmN | Lowering of TSmN due to additive | Ripening temperature | Fixation Temperature | Streak defect | Front contrast | Crystallization | Re 550 | Rth 550 |
|---|---|---|---|---|---|---|---|---|---|---|---|---|---|---|---|
| Comparative Example 1 | L-1 | None | — | — | 133° C. | — | 75° C. | — | 140° C. | 50° C. | 2 | C | No | 144 | 71 |
| Example 1 | L-1 | A-1 | <25° C. | 285 | 131° C. | 2° C. | 70° C. | 5° C. | 140° C. | 50° C. | 4 | A | No | 142 | 70 |
| Example 2 | L-1 | A-2 | <25° C. | 285< | 129° C. | 4° C. | 70° C. | 5° C. | 140° C. | 50° C. | 4 | A | No | 142 | 70 |
| Example 3 | L-1 | A-3 | 99° C. | 285< | 104° C. | 29° C. | 47° C. | 28° C. | 140° C. | 47° C. | 3 | — | Yes | 145 | 71 |
| Comparative Example 2 | L-1 | A-4 | <25° C. | 285< | 80° C. | 53° C. | 45° C. | 30° C. | 140° C. | 45° C. | 2 | C | No | 140 | 69 |
| Comparative Example 3 | L-2 | None | — | — | 168° C. | — | 133° C. | — | 170° C. | 105° C. | 2 | C | No | 105 | 51 |
| Example 4 | L-2 | A-3 | 99° C. | 285< | 158° C. | 10° C. | 110° C. | 13° C. | 170° C. | 105° C. | 3 | B | No | 102 | 50 |
| Comparative Example 4 | L-3 | None | — | — | 115° C. | — | 70° C. | — | 120° C. | 40° C. | 1 | C | No | 133 | 65 |
| Example 5 | L-3 | A-1 | <25° C. | 285 | 105° C. | 10° C. | 65° C. | 5° C. | 120° C. | 40° C. | 4 | A | No | 130 | 64 |
| Example 6 | L-1 | A-1 | <25° C. | 285 | 131° C. | 2° C. | 70° C. | 5° C. | 100° C. | 50° C. | 3 | B | No | 142 | 70 |
| Example 7 | L-1 | A-1 | <25° C. | 285 | 131° C. | 2° C. | 70° C. | 5° C. | 140° C. | 70° C. | 3 | B | No | 138 | 68 |
| Example 11 | L-1 | A-5 | <25° C. | 275 | 132° C. | 1° C. | 71° C. | 4° C. | 140° C. | 50° C. | 4 | A | No | 143 | 71 |
| Example 12 | L-1 | A-6 | <25° C. | 256 | 132° C. | 1° C. | 71° C. | 4° C. | 140° C. | 50° C. | 4 | A | No | 143 | 71 |
| Example 13 | L-1 | A-7 | <25° C. | 285< | 129° C. | 4° C. | 70° C. | 5° C. | 140° C. | 50° C. | 4 | A | No | 141 | 70 |
| Example 14 | L-1 | A-8 | <25° C. | 285< | 124° C. | 9° C. | 62° C. | 13° C. | 140° C. | 50° C. | 3 | B | No | 140 | 69 |
| Comparative Example 11 | L-1 | A-9 | <25° C. | 285< | 104° C. | 29° C. | 57° C. | 18° C. | 140° C. | 50° C. | 2 | C | No | 140 | 68 |
| Comparative Example 12 | L-1 | A-10 | <25° C. | 285< | 78° C. | 55° C. | 45° C. | 30° C. | 140° C. | 50° C. | 2 | C | No | 139 | 69 |
| Comparative Example 13 | L-1 | A-11 | 26° C. | 83 | 133° C. | 0° C. | 75° C. | 0° C. | 140° C. | 50° C. | 2 | C | No | 144 | 70 |

TABLE 4

| | Support | Under-coat | Photo-alignment film | Rubbing | Additive | Melting point of additive | TNI | Lowering of TNI due to additive | TSmN | Ripening temperature | Fixation temperature |
|---|---|---|---|---|---|---|---|---|---|---|---|
| Comparative Example 5 | Single-sided polarizing plate | None | Used | No | None | <25° C. | 133° C. | — | 75° C. | 80° C. | 50° C. |
| Example 8 | Single-sided polarizing plate | None | Used | No | A-1 | <25° C. | 131° C. | 2° C. | 70° C. | 80° C. | 50° C. |
| Comparative Example 6 | Single-sided polarizing plate | None | None | Yes | None | <25° C. | 133° C. | — | 75° C. | 80° C. | 50° C. |
| Example 9 | Single-sided polarizing plate | None | None | Yes | A-1 | <25° C. | 131° C. | 2° C. | 70° C. | 80° C. | 50° C. |

TABLE 5

| | Streak defect | Front contrast | Crystallization |
|---|---|---|---|
| Comparative Example 5 | 1 | D | No |
| Example 8 | 3 | B | No |
| Comparative Example 6 | 1 | D | No |
| Example 9 | 3 | B | No |

The invention claimed is:

1. A retardation film in which a liquid crystal compound capable of showing a smectic phase is fixed in the smectic phase, the retardation film having a suppressed streak defect, the retardation film being formed of a composition comprising the liquid crystal compound capable of showing a smectic phase and a non-liquid crystal compound, the non-liquid crystal compound satisfying the conditions A and B below, and the composition having a phase transition temperature between a nematic phase and an isotropic phase and a phase transition temperature between a smectic phase and a nematic phase:

molecular weight is 10000 or less; and   condition A:

$T0-T1 \leq 30°$ C.,   condition B:

where, T0 represents a phase transition temperature, in ° C., between a nematic phase and an isotropic phase, of a composition which contains the liquid crystal compound showing the smectic phase, and does not contain the non-liquid crystal compound, and T1 represents a phase transition temperature, in ° C., between a nematic phase and an isotropic phase, of a composition which contains the liquid crystal compound showing the smectic phase, and 6% by mass, relative to the mass of the liquid crystal compound, of the non-liquid crystal compound, wherein the liquid crystal compound is represented by Formula (II) and at the same time is capable of showing a smectic phase:

$L_1$-$G_1$-$D_1$-Ar-$D_2$-$G_2$-$L_2$   Formula (II)

in Formula (II), each of $D_1$ and $D_2$ independently represents —CO—O—, —O—CO—, —C(=S)O—, —O—C(=S)—, —$CR^1R^2$—, —$CR^1R^2$—$CR^3R^4$—, —O—$CR^1R^2$—, —$CR^1R^2$—O—, —$CR^1R^2$—O—$CR^3R^4$—, —$CR^1R^2$—O—CO—, —O—CO—$CR^1R^2$—, —$CR^1R^2$—O—CO—$CR^3R^4$—, —$CR^1R^2$—CO—O—$CR^3R^4$—, —$NR^1$—$CR^2R^3$—, —$CR^1R^2$—$NR^3$—, —CO—$NR^1$—, or —$NR^1$—CO—, and each of $R^1$, $R^2$, $R^3$ and $R^4$ independently represents a hydrogen atom, halogen atom, or alkyl group having 1 to 4 carbon atoms, each of $G_1$ and $G_2$ independently represents a divalent alicyclic hydrocarbon group having 5 to 8 carbon atoms, a methylene group contained in the alicyclic hydrocarbon group may be substituted by —O—, —S—, —NH— or —NH—, each of $L_1$ and $L_2$ independently represents a monovalent organic group, at least one species selected from the group consisting of $L_1$ and $L_2$ represents a monovalent group having a polymerizable group, Ar represents a divalent aromatic ring group represented by Formula (II-1), (II-2), (II-3) or (II-4) below:

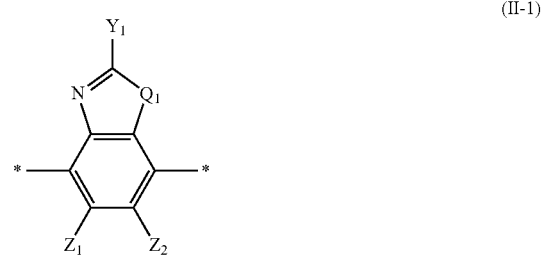

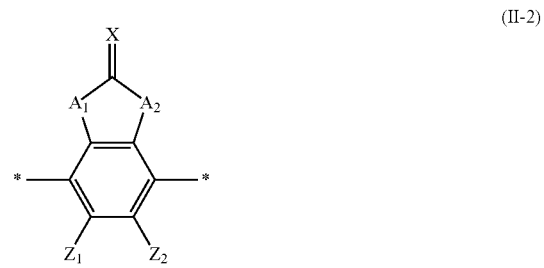

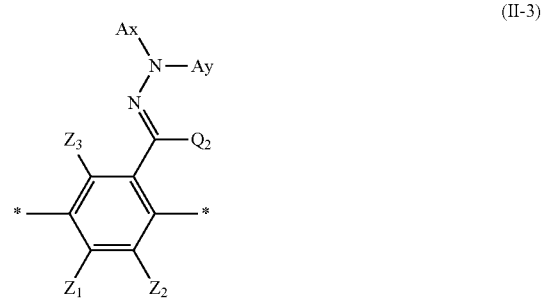

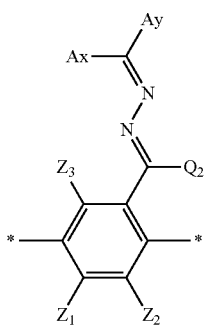

(II-4)

in Formulae (II-1) to (II-4), $Q_1$ represents —S—, —O—, or $NR^{11}$—, $R^{11}$ represents a hydrogen atom or alkyl group having 1 to 6 carbon atoms, $Y_1$ represents an aromatic hydrocarbon group having 6 to 12 carbon atoms, or, aromatic heterocyclic group having 3 to 12 carbon atoms, each of $Z_1$, $Z_2$, and $Z_3$ independently represents a hydrogen atom or aliphatic hydrocarbon group having 1 to 20 carbon atoms, alicyclic hydrocarbon group having 3 to 20 carbon atoms, monovalent aromatic hydrocarbon group having 6 to 20 carbon atoms, halogen atom, cyano group, nitro group, —$NR^{12}R^{13}$ or $SR^{12}$, $Z_1$ and $Z_2$ may mutually combine to form an aromatic ring or aromatic heterocycle, each of $R^{12}$ and $R^{13}$ independently represents a hydrogen atom or alkyl group having 1 to 6 carbon atoms, each of $A_1$ and $A_2$ independently represents a group selected from the group consisting of —O—, —$NR^{21}$—($R^{21}$ represents a hydrogen atom or substituent), —S— and —CO—, X represents a hydrogen atom or optionally substituted Group XIV to XVI non-metal atom in the Periodic Table, Ax represents an organic group having 2 to 30 carbon atoms and having at least one aromatic ring selected from the group consisting of aromatic hydrocarbon ring and aromatic heterocycle, Ay represents a hydrogen atom, optionally substituted alkyl group having 1 to 6 carbon atoms, or, organic group having 2 to 30 carbon atoms, and having at least one aromatic ring selected from the group consisting of aromatic hydrocarbon ring and aromatic heterocycle, the aromatic ring possessed by Ax and Ay may have a substituent, Ax and Ay may mutually combine to form a ring, and $Q_2$ represents a hydrogen atom, or, optionally substituted alkyl group having 1 to 6 carbon atoms.

2. The retardation film of claim 1, in which the non-liquid crystal compound satisfies the condition B-1 below:

T0−T1≤10° C.  condition B-1:

where T0 and T1 are as defined in claim 1.

3. The retardation film of claim 1, wherein the non-liquid crystal compound satisfies the conditions C and D below:

boiling point>T0; and  condition C:

T0′−T1′≤15° C.,  condition D:

where T0 is as defined in claim 1,
T0′ represents a phase transition temperature, in ° C., between a smectic phase and a nematic phase, of a composition which contains the liquid crystal compound showing the smectic phase, and does not contain the non-liquid crystal compound, and
T1′ represents a phase transition temperature, in ° C., between a smectic phase and a nematic phase, of a composition which contains the liquid crystal compound showing the smectic phase, and 6% by mass, relative to the mass of the liquid crystal compound, of the non-liquid crystal compound.

4. The retardation film of claim 1,
wherein the non-liquid crystal compound has a melting point lower than the phase transition temperature between the nematic phase and the smectic phase of the composition for forming the retardation film.

5. The retardation film of claim 4,
wherein the phase transition temperature between the nematic phase and the smectic phase of the composition for forming the retardation film is 100° C. or below.

6. The retardation film of claim 1, which satisfies the relational expression below:

Re450/Re550<1 where, Re450 represents in-plane retardation at 450 nm, and Re550 represents in-plane retardation at 550 nm.

7. The retardation film of claim 1, which satisfies:

nx>ny=nz, where, nx represents a refractive index of an optically-anisotropic layer measured in the plane thereof and in the direction of the slow axis, ny represents a refractive index of the optically-anisotropic layer measured in the plane thereof and in the direction normal to nx, and nz represents a refractive index in the direction normal to nx and ny.

8. The retardation film of claim 1, in which the liquid crystal compound is fixed at a temperature 10° C. or more lower than the phase transition temperature between the nematic phase and the smectic phase.

9. The retardation film of claim 8,
wherein the liquid crystal compound is heated to a temperature not lower than the phase transition temperature between the nematic phase and the isotropic phase, and then fixed at a temperature 10° C. or more lower than the phase transition temperature between the nematic phase and the smectic phase.

10. The retardation film of claim 1, in which the non-liquid crystal compound is one or more compounds selected from a group consisting of the following compounds:

$CH_3O$—$CH_2$—$CH_2$—O—$CH_2$—$CH_2$—O—$CH_2$—$CH_2$—O—$CH_2$—$CH_2$—$OCH_3$;

$CH_3(CH_2)_3$—O—$CH_2$—$CH_2$—O—$CH_2$—$CH_2$—O—$(CH_2)_3CH_3$;

$CH_2$=CHCOO—$(CH(CH_3)CH_2O)_m$—$(CH_2CH(CH_3)O)_n$OCCH=$CH_2$(m+n=3); and $CH_2$=CH—CO—O$(CH_2$—$CH_2O)_n$OC—CH=$CH_2$ (n=4).

11. The retardation film of claim 1, in which the non-liquid crystal compound is one or more compounds selected from a group consisting of the following compounds:

M-1

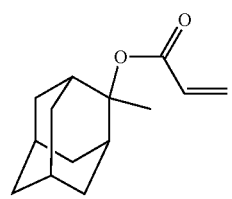

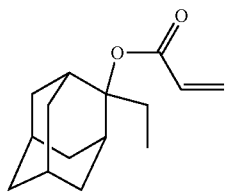
M-2
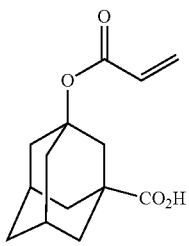
M-9
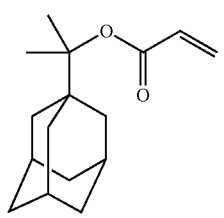
M-3
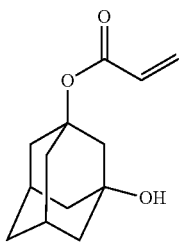
M-10
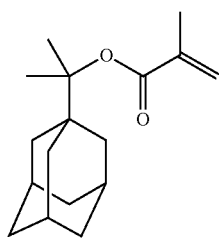
M-4
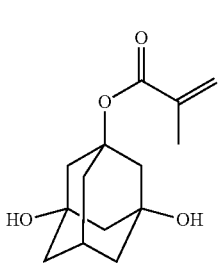
M-11
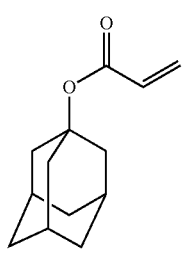
M-5
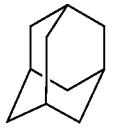
M-12
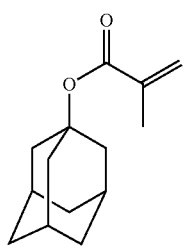
M-6
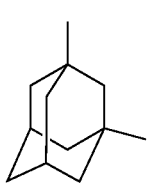
M-13
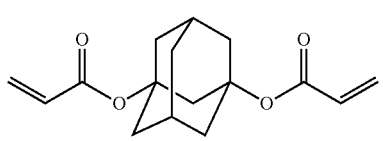
M-7
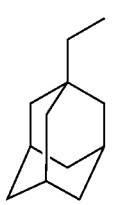
M-14
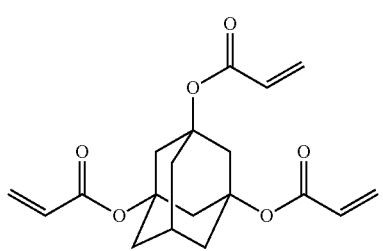
M-8
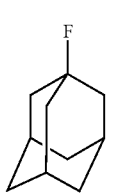
M-15

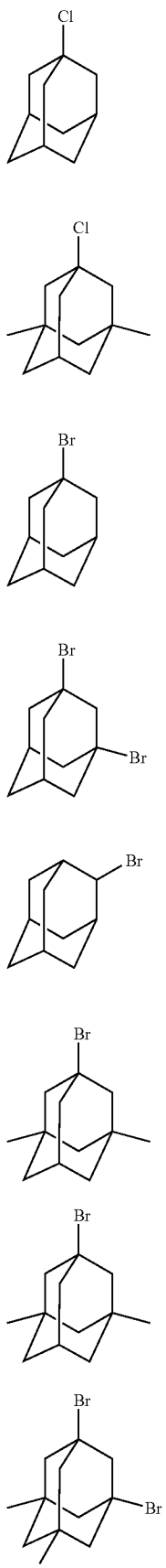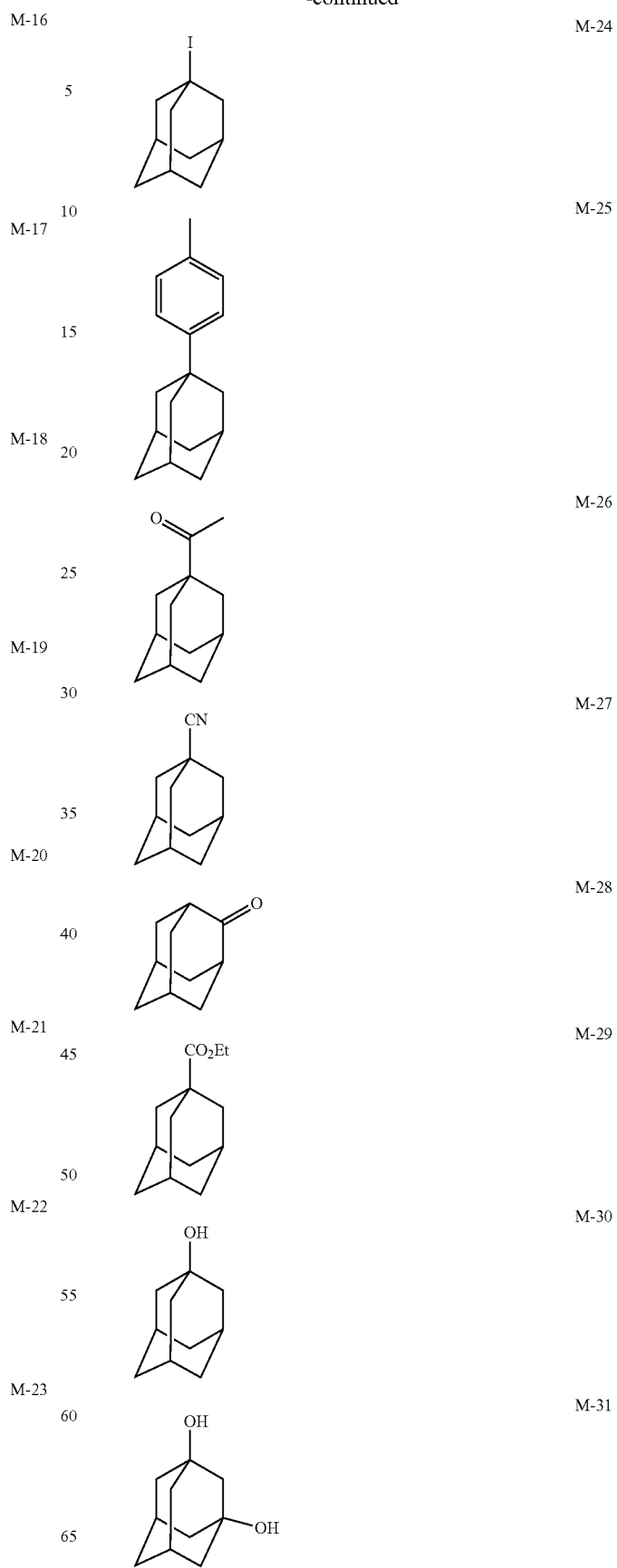

M-32 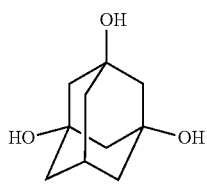
M-33 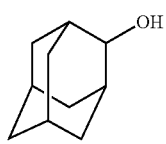
M-34 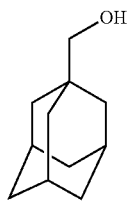
M-35 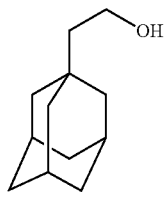
M-36 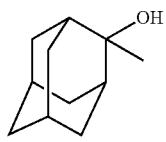
M-37 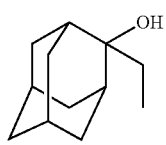
M-38 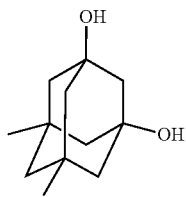
M-39 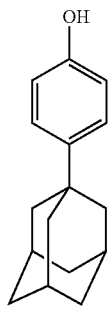
M-40 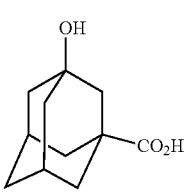
M-41 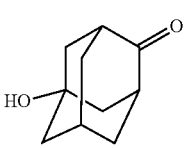
M-42 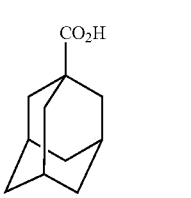
M-43 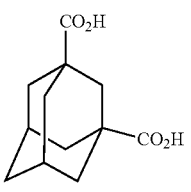
M-44 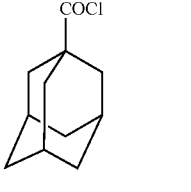
M-45 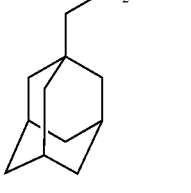
M-46 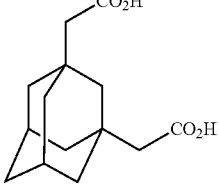
M-47 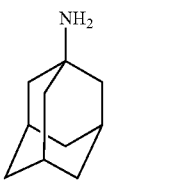

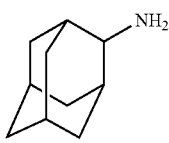 M-48

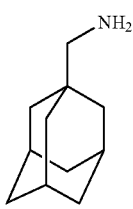 M-49

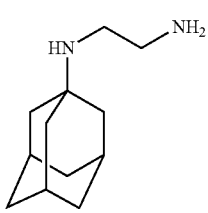 M-50

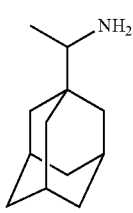 M-51

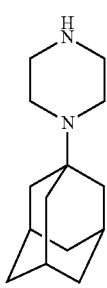 M-52

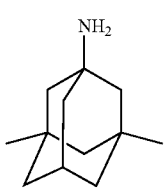 M-53

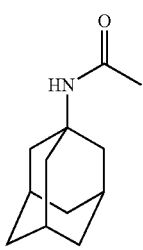 M-54

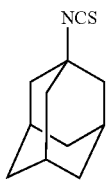 M-55

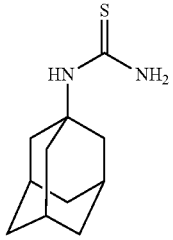 M-56

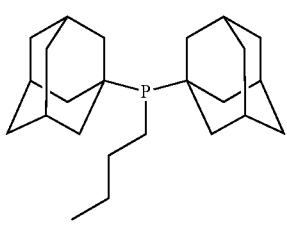 M-57

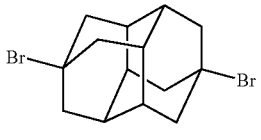 M-58

 M-59

12. A retardation film in which a liquid crystal compound capable of showing a smectic phase is fixed in the smectic phase, the retardation film having a suppressed streak defect, the retardation film being formed of a composition comprising the liquid crystal compound capable of showing a smectic phase and a non-liquid crystal compound, the non-liquid crystal compound satisfying the conditions A and B below, and having a bridged cyclic structure, the composition having a phase transition temperature between a nematic phase and an isotropic phase and a phase transition temperature between a smectic phase and a nematic phase:

molecular weight is 1000 or less; and   condition A:

$T0-T1 \leq 30°$ C.,   condition B:

where, T0 represents a phase transition temperature, in ° C., between a nematic phase and an isotropic phase, of a composition which contains the liquid crystal compound showing the smectic phase, and does not contain the non-liquid crystal compound, and T1 represents the phase transition temperature, in ° C., between a nematic phase and an isotropic phase, of a composition which contains the liquid crystal compound showing the smectic phase, and 6% by mass, relative to the mass of the liquid crystal compound, of the non-liquid crystal compound, wherein the liquid crystal compound is represented by Formula (II) and at the same time is capable of showing a smectic phase:

L₁-G₁-D₁-Ar-D₂-G₂-L₂    Formula (II)

in Formula (II), each of $D_1$ and $D_2$ independently represents —CO—O—, —O—CO—, —C(=S)O—, —O—C(=S)—, —CR¹R²—, —CR¹R²—CR³R⁴—, —O—CR¹R²—, —CR¹R²—O—, —CR¹R²—O—CR³R⁴—, —CR¹R²—O—CO—, —O—CO—CR¹R²—, —CR¹R²—O—CO—CR³R⁴—, —CR¹R²—CO—O—CR³R⁴—, —NR¹—CR²R³—, —CR¹R²—NR³—, —CO—NR¹—, or —NR¹—CO—, and each of $R^1$, $R^2$, $R^3$ and $R^4$ independently represents a hydrogen atom, halogen atom, or alkyl group having 1 to 4 carbon atoms, each of $G_1$ and $G_2$ independently represents a divalent alicyclic hydrocarbon group having 5 to 8 carbon atoms, a methylene group contained in the alicyclic hydrocarbon group may be substituted by —O—, —S—, —NH— or —NH—, each of $L_1$ and $L_2$ independently represents a monovalent organic group, at least one species selected from the group consisting of $L_1$ and $L_2$ represents a monovalent group having a polymerizable group, Ar represents a divalent aromatic ring group represented by Formula (II-1), (II-2), (II-3) or (II-4) below:

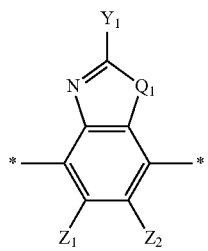

(II-1)

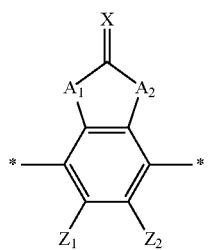

(II-2)

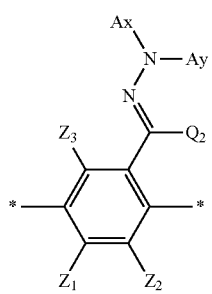

(II-3)

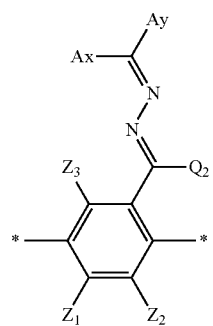

(II-4)

in Formulae (II-1) to (II-4), $Q_1$ represents —S—, —O—, or —NR¹¹—, $R^{11}$ represents a hydrogen atom or alkyl group having 1 to 6 carbon atoms, $Y_1$ represents an aromatic hydrocarbon group having 6 to 12 carbon atoms, or, aromatic heterocyclic group having 3 to 12 carbon atoms, each of $Z_1$, $Z_2$, and $Z_3$ independently represents a hydrogen atom or aliphatic hydrocarbon group having 1 to 20 carbon atoms, alicyclic hydrocarbon group having 3 to 20 carbon atoms, monovalent aromatic hydrocarbon group having 6 to 20 carbon atoms, halogen atom, cyano group, nitro group, —NR¹²R¹³ or SR¹², $Z_1$ and $Z_2$ may mutually combine to form an aromatic ring or aromatic heterocycle, each of $R^{12}$ and $R^{13}$ independently represents a hydrogen atom or alkyl group having 1 to 6 carbon atoms, each of $A_1$ and $A_2$ independently represents a group selected from the group consisting of —O—, —NR²¹— ($R^{21}$ represents a hydrogen atom or substituent), —S— and —CO—, X represents a hydrogen atom or optionally substituted Group XIV to XVI non-metal atom in the Periodic Table, Ax represents an organic group having 2 to 30 carbon atoms and having at least one aromatic ring selected from the group consisting of aromatic hydrocarbon ring and aromatic heterocycle, Ay represents a hydrogen atom, optionally substituted alkyl group having 1 to 6 carbon atoms, or, organic group having 2 to 30 carbon atoms, and having at least one aromatic ring selected from the group consisting of aromatic hydrocarbon ring and aromatic heterocycle, the aromatic ring possessed by Ax and Ay may have a substituent, Ax and Ay may mutually combine to form a ring, and $Q_2$ represents a hydrogen atom, or, optionally substituted alkyl group having 1 to 6 carbon atoms.

13. The retardation film of claim 12, in which the non-liquid crystal compound is one or more compounds selected from a group consisting of the following compounds:

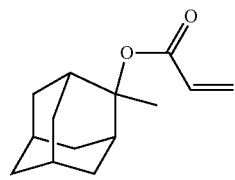

M-1

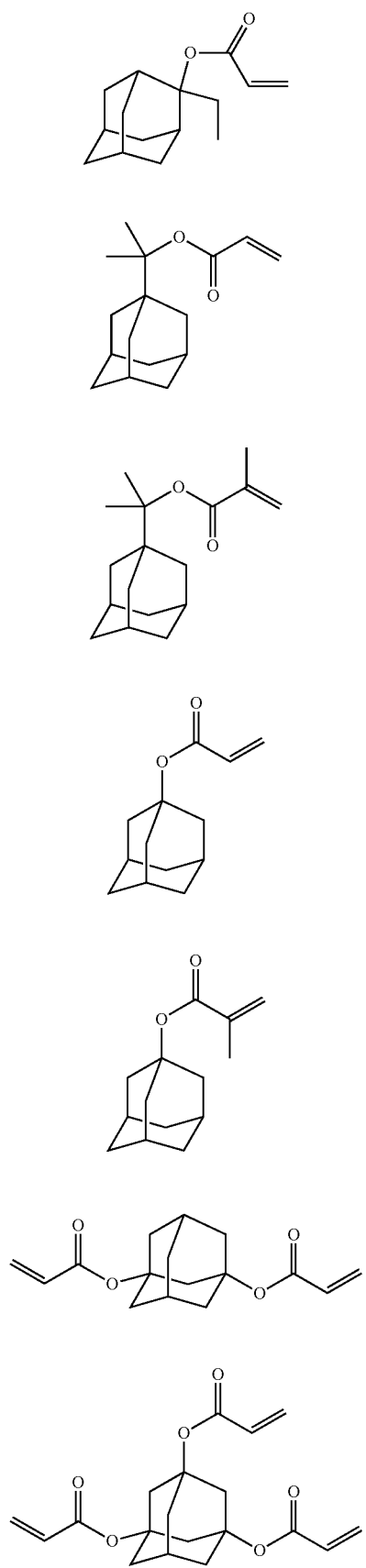

-continued
M-17 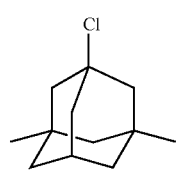
M-18 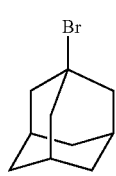
M-19 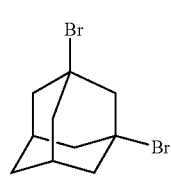
M-20 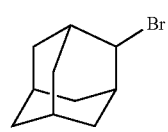
M-21 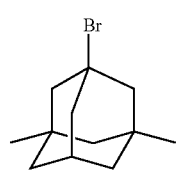
M-22 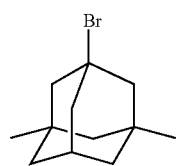
M-23 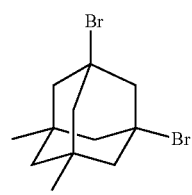
M-24 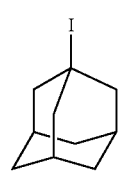
-continued
M-25 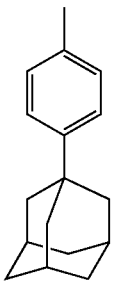
M-26 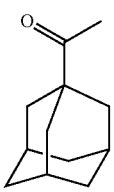
M-27 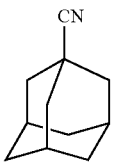
M-28 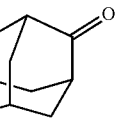
M-29 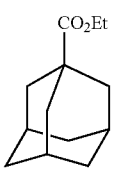
M-30 
M-31 
M-32 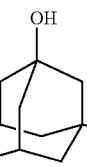
M-33 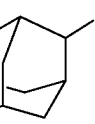

-continued
M-34 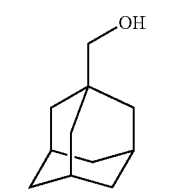
M-35 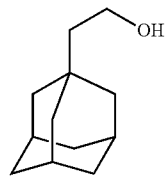
M-36 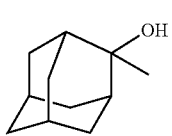
M-37 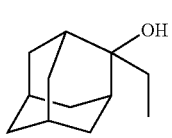
M-38 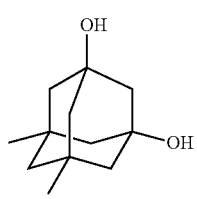
M-39 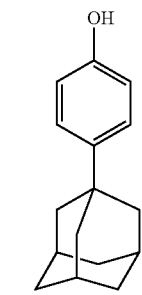
M-40 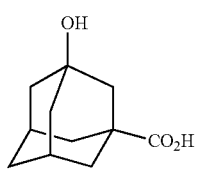
M-41 
M-42 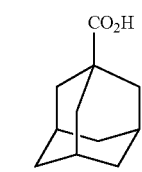
-continued
M-43 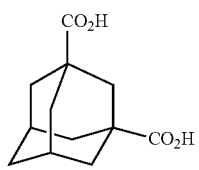
M-44 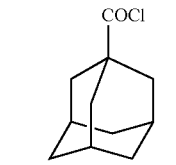
M-45 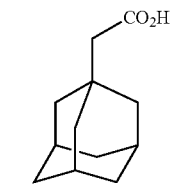
M-46 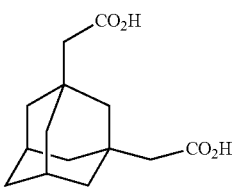
M-47 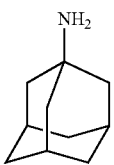
M-48 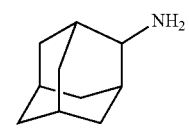
M-49 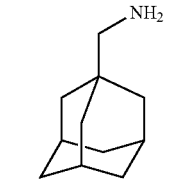
M-50 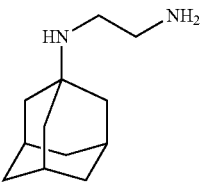
M-51 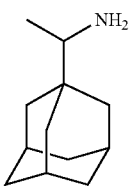

M-52 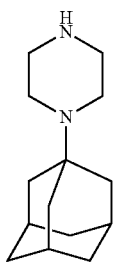

M-53 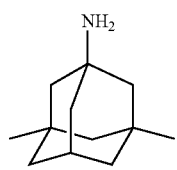

M-54 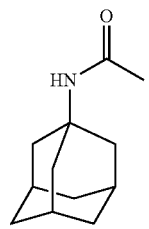

M-55 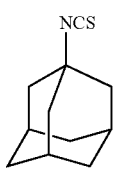

M-56 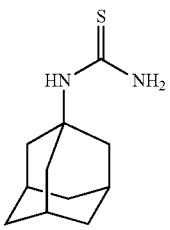

M-57 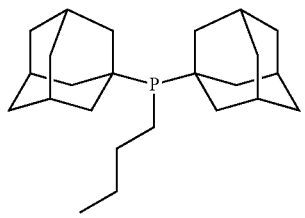

M-58 

M-59 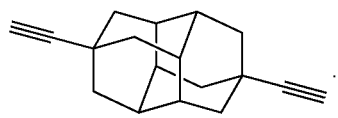

14. A composition for forming a retardation film having a suppressed streak defect, the composition comprising a liquid crystal compound showing a smectic phase and a non-liquid crystal compound, the non-liquid crystal compound satisfying the conditions A and B below, and the composition having a phase transition temperature between a nematic phase and an isotropic phase and a phase transition temperature between a smectic phase and a nematic phase:

molecular weight is 1000 or less; condition A:

$T0-T1 \leq 30°$ C., condition B:

where, T0 represents a phase transition temperature, in ° C., between a nematic phase and an isotropic phase, of a composition which contains the liquid crystal compound showing the smectic phase, and does not contain the non-liquid crystal compound, and T1 represents a phase transition temperature, in ° C., between a nematic phase and an isotropic phase, of a composition which contains the liquid crystal compound showing the smectic phase, and 6% by mass, relative to the mass of the liquid crystal compound, of the non-liquid crystal compound, wherein the liquid crystal compound is represented by Formula (II) and at the same time is capable of showing a smectic phase:

$$L_1\text{-}G_1\text{-}D_1\text{-}Ar\text{-}D_2\text{-}G_2\text{-}L_2 \qquad \text{Formula (II)}$$

in Formula (II), each of $D_1$ and $D_2$ independently represents —CO—O—, —O—CO—, —C(=S)O—, —O—C(=S)—, —$CR^1R^2$—, —$CR^1R^2$—$CR^3R^4$—, —O—$CR^1R^2$—, —$CR^1R^2$—O—, —$CR^1R^2$—O—$CR^3R^4$—, —$CR^1R^2$—O—CO—, —O—CO—$CR^1R^2$—, —$CR^1R^2$—O—CO—$CR^3R^4$—, —$CR^1R^2$—CO—O—$CR^3R^4$—, —$NR^1$—$CR^2R^3$—, —$CR^1R^2$—$NR^3$—, —CO—$NR^1$—, or —$NR^1$—CO—, and each of $R^1$, $R^2$, $R^3$ and $R^4$ independently represents a hydrogen atom, halogen atom, or alkyl group having 1 to 4 carbon atoms, each of $G_1$ and $G_2$ independently represents a divalent alicyclic hydrocarbon group having 5 to 8 carbon atoms, a methylene group contained in the alicyclic hydrocarbon group may be substituted by —O—, —S—, —NH— or —NH—, each of $L_1$ and $L_2$ independently represents a monovalent organic group, at least one species selected from the group consisting of $L_1$ and $L_2$ represents a monovalent group having a polymerizable group, Ar represents a divalent aromatic ring group represented by Formula (II-1), (II-2), (II-3) or (II-4) below:

(II-1)

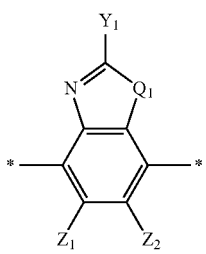

(II-2)

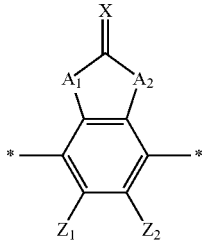

(II-3)

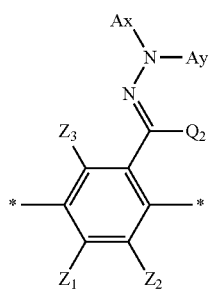

(II-4)

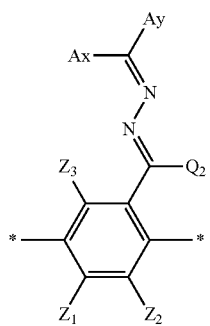

in Formulae (II-1) to (II-4), $Q_1$ represents —S—, —O—, or $NR^{11}$—, $R^{11}$ represents a hydrogen atom or alkyl group having 1 to 6 carbon atoms, $Y_1$ represents an aromatic hydrocarbon group having 6 to 12 carbon atoms, or, aromatic heterocyclic group having 3 to 12 carbon atoms, each of $Z_1$, $Z_2$, and $Z_3$ independently represents a hydrogen atom or aliphatic hydrocarbon group having 1 to 20 carbon atoms, alicyclic hydrocarbon group having 3 to 20 carbon atoms, monovalent aromatic hydrocarbon group having 6 and 20 carbon atoms, halogen atom, cyano group, nitro group, $—NR^{12}R^{13}$ or $SR^{12}$, $Z_1$ and $Z_2$ may mutually combine to form an aromatic ring or aromatic heterocycle, each of $R^{12}$ and $R^{13}$ independently represents a hydrogen atom or alkyl group having 1 to 6 carbon atoms, each of $A_1$ and $A_2$ independently represents a group selected from the group consisting of —O—, $—NR^{21}$— ($R^{21}$ represents a hydrogen atom or substituent), —S— and —CO—, X represents a hydrogen atom or optionally substituted Group XIV to XVI non-metal atom in the Periodic Table, Ax represents an organic group having 2 to 30 carbon atoms and having at least one aromatic ring selected from the group consisting of aromatic hydrocarbon ring and aromatic heterocycle, Ay represents a hydrogen atom, optionally substituted alkyl group having 1 to 6 carbon atoms, or, organic group having 2 to 30 carbon atoms, and having at least one aromatic ring selected from the group consisting of aromatic hydrocarbon ring and aromatic heterocycle, the aromatic ring possessed by Ax and Ay may have a substituent, Ax and Ay may mutually combine to form a ring, and $Q_2$ represents a hydrogen atom, or, optionally substituted alkyl group having 1 to 6 carbon atoms.

15. A laminate comprising the retardation film of claim 1 and a second retardation film.

16. The laminate of claim 15,
wherein the second retardation film satisfies:

nx>ny=nz, where, nx represents a refractive index of an optically-anisotropic layer measured in the plane thereof and in the direction of the slow axis, ny represents a refractive index of the optically-anisotropic layer measured in the plane thereof and in the direction normal to nx, and nz represents a refractive index in the direction normal to nx and ny.

17. A polarizing plate comprising a polarizer, and the retardation film of claim 1.

18. The polarizing plate of claim 17, wherein the retardation film resides on the surface of the polarizer, or a film having thickness of 10 μm or thinner resides between the polarizer and the retardation film.

19. A liquid crystal display device comprising the retardation film of claim 1.

* * * * *